(12) United States Patent  
Diokno et al.

(10) Patent No.: US 12,342,864 B2
(45) Date of Patent: Jul. 1, 2025

(54) GELS WICKS FOR VAPORIZER DEVICES

(71) Applicant: JUUL Labs, Inc., San Francisco, CA (US)

(72) Inventors: Kristopher P. Diokno, San Jose, CA (US); Namhey Lee, Hayward, CA (US); Anusha Saripalli, Santa Clara, CA (US); Krishnamohan Sharma, Milpitas, CA (US)

(73) Assignee: JUUL Labs, Inc., Washington, DC (US)

( * ) Notice: Subject to any disclaimer, the term of this patent is extended or adjusted under 35 U.S.C. 154(b) by 397 days.

(21) Appl. No.: 17/841,072

(22) Filed: Jun. 15, 2022

(65) Prior Publication Data

US 2022/0312841 A1 Oct. 6, 2022

Related U.S. Application Data

(63) Continuation of application No. PCT/US2020/065597, filed on Dec. 17, 2020.

(60) Provisional application No. 62/950,817, filed on Dec. 19, 2019.

(51) Int. Cl.
*A24F 40/44* (2020.01)
*A24F 40/10* (2020.01)
*A24F 40/42* (2020.01)
*A24F 40/46* (2020.01)
(Continued)

(52) U.S. Cl.
CPC .............. *A24F 40/44* (2020.01); *A24F 40/46* (2020.01); *C08L 33/20* (2013.01); *C08L 33/26* (2013.01)

(58) Field of Classification Search
None
See application file for complete search history.

(56) References Cited

U.S. PATENT DOCUMENTS

| 6,090,331 A | 7/2000 | Schwarz et al. |
| 2008/0056691 A1 | 3/2008 | Wingo et al. |
| 2010/0065653 A1 | 3/2010 | Wingo et al. |

(Continued)

FOREIGN PATENT DOCUMENTS

| CN | 109744577 A | * | 5/2019 | ............. A24F 40/30 |
| VN | 10020480 B | | 2/2019 | |

(Continued)

OTHER PUBLICATIONS

CN 109744577 A English translation obtained from Espacenet, pp. 1-13 (Year: 2019).*

(Continued)

*Primary Examiner* — Philip Y Louie
*Assistant Examiner* — Madeleine P Delacruz
(74) *Attorney, Agent, or Firm* — Mintz, Levin, Cono, Ferris, Glovsky and Popeo, P.C.

(57) ABSTRACT

A vaporization device includes a vaporizer cartridge having a reservoir that holds a vaporizable material, a heating element, and a gel wicking element that can draw the vaporizable material to the heating element to be vaporized. The vaporizer cartridge is configured for coupling to a vaporizer device body and containing a vaporizable material. Various embodiments of the vaporizer cartridge are described that include one or more features for the wicking element. Various embodiments of the wicking element, as well as related systems, methods, and articles of manufacture are also described.

19 Claims, 5 Drawing Sheets

(51) Int. Cl.
  *C08L 33/20* (2006.01)
  *C08L 33/26* (2006.01)

(56) References Cited

U.S. PATENT DOCUMENTS

| | | |
|---|---|---|
| 2013/0228191 A1 | 9/2013 | Newton |
| 2014/0209105 A1 | 7/2014 | Sears et al. |
| 2017/0181427 A1 | 6/2017 | Shani et al. |
| 2018/0279673 A1* | 10/2018 | Sebastian ................ A24F 40/44 |
| 2022/0046979 A1* | 2/2022 | Campitelli ............... A24D 1/02 |

FOREIGN PATENT DOCUMENTS

| | | | |
|---|---|---|---|
| WO | WO-9853866 A1 | 12/1998 | |
| WO | WO-2019193311 A1 | 10/2019 | |
| WO | WO-2020161336 A1 * | 8/2020 | ............... A23G 3/36 |

OTHER PUBLICATIONS

Li et al. (Oct. 2012) "Effect of Acid-Catalyzed Sol-Gel Silica coating on the Properties of Cotton Fabric", The Journal of The Textile Institute, vol. 103 (10) pp. 1099-1107.

* cited by examiner

GELS WICKS FOR VAPORIZER DEVICES

CROSS-REFERENCE TO RELATED APPLICATIONS

The present application is a continuation application, filed under 35 U.S.C. § 120, of International Patent Application No. PCT/US2020/065597 entitled "Gels Wicks for Vaporizer Devices" with an International Filing Date of Dec. 17, 2020, which claims priority to U.S. Provisional Patent Application No. 62/950,817 entitled "Gel Wicks for Vaporizer Devices" filed on Dec. 19, 2019, which is hereby incorporated by reference in its entirety, to the extent permitted.

TECHNICAL FIELD

The subject matter described herein relates to vaporizer devices, including wicks for incorporating in vaporizer devices.

BACKGROUND

Vaporizer devices, which can also be referred to as vaporizers, electronic vaporizer devices, or e-vaporizer devices, can be used for delivery of an aerosol (for example, a vapor-phase and/or condensed-phase material suspended in a stationary or moving mass of air or some other gas carrier) containing one or more active ingredients by inhalation of the aerosol by a user of the vaporizing device. For example, electronic nicotine delivery systems (ENDS) include a class of vaporizer devices that are battery powered and that can be used to simulate the experience of smoking, but without burning of tobacco or other substances. Vaporizers are gaining increasing popularity both for prescriptive medical use, in delivering medicaments, and for consumption of tobacco, nicotine, and other plant-based materials. Vaporizer devices can be portable, self-contained, and/or convenient for use.

In use of a vaporizer device, the user inhales an aerosol, colloquially referred to as "vapor," which can be generated by a heating element that vaporizes (e.g., causes a liquid or solid to at least partially transition to the gas phase) a vaporizable material, which can be liquid, a solution, a solid, a paste, a wax, and/or any other form compatible for use with a specific vaporizer device. The vaporizable material used with a vaporizer can be contained within a cartridge for example, a separable part of the vaporizer device that contains vaporizable material) that includes an outlet (for example, a mouthpiece) for inhalation of the aerosol by a user.

To receive the inhalable aerosol generated by a vaporizer device, a user may, in certain examples, activate the vaporizer device by taking a puff, by pressing a button, and/or by some other approach. A puff as used herein can refer to inhalation by the user in a manner that causes a volume of air to be drawn into the vaporizer device such that the inhalable aerosol is generated by a combination of the vaporized vaporizable material with the volume of air.

An approach by which a vaporizer device generates an inhalable aerosol from a vaporizable material involves heating the vaporizable material in a vaporization chamber (e.g., a heater chamber) to cause the vaporizable material to be converted to the gas (or vapor) phase. A vaporization chamber can refer to an area or volume in the vaporizer device within which a heat source (for example, a conductive, convective, and/or radiative heat source) causes heating of a vaporizable material to produce a mixture of air and vaporized material to form a vapor for inhalation of the vaporizable material by a user of the vaporization device.

In some implementations, the vaporizable material can be drawn out of a reservoir and into the vaporization chamber via a wicking element (e.g., a wick). Drawing of the vaporizable material into the vaporization chamber can be at least partially due to capillary action provided by the wick as the wick pulls the vaporizable material along the wick in the direction of the vaporization chamber. Alternatively, the wick can transport the vaporizable material into the vaporization chamber at least partially by diffusion.

Vaporizer devices can be controlled by one or more controllers, electronic circuits (for example, sensors, heating elements), and/or the like on the vaporizer. Vaporizer devices can also wirelessly communicate with an external controller for example, a computing device such as a smartphone).

SUMMARY

In certain aspects of the current subject matter, challenges associated with wicking by capillary action can be addressed by inclusion of one or more of the features described herein or comparable/equivalent approaches as would be understood by one of ordinary skill in the art. Aspects of the current subject matter include methods, apparatuses, compositions, and systems related to gel wicks for use in vaporizer devices.

In some variations, one or more of the following features may optionally be included in any feasible combination.

In one aspect, a cartridge for a vaporizer device is disclosed. The cartridge may include a reservoir configured to contain a vaporizable material. In addition, the cartridge may include an atomizer comprising a heating element and a gel wick. The atomizer may be configured to heat the vaporizable material to generate a vapor.

In another aspect, a device comprising a receptacle configured to receive the cartridge is disclosed.

In another aspect, a gel wick for drawing a vaporizable material from a reservoir in a vaporization device is disclosed. In one aspect the gel wick may include a superabsorbent polymer.

In another aspect, the gel wick may include a polysaccharide and a gel modifier.

In yet another aspect, the gel wick may include a cellulose matrix and a water-soluble polymer.

In another aspect, the gel wick may include an alginate and an alginate crosslinker.

In another aspect, the gel wick may include a sol-gel matrix.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

BRIEF DESCRIPTION OF THE DRAWINGS

The accompanying drawings, which are incorporated into and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the current subject matter include methods, apparatuses, articles of manufacture, and systems relating to vaporization of one or more materials for inhalation by a user. Example implementations include vaporizer devices and systems including vaporizer devices. The term "vaporizer device" as used in the following description and claims refers to any of a self-contained apparatus, an apparatus that includes two or more separable parts (for example, a vaporizer body that includes a battery and other hardware, and a cartridge that includes a vaporizable material), and/or the like. A "vaporizer system," as used herein, can include one or more components, such as a vaporizer device. Examples of vaporizer devices consistent with implementations of the current subject matter include electronic vaporizers, electronic nicotine delivery systems (ENDS), and/or the like. In general, such vaporizer devices are hand-held devices that heat (such as by convection, conduction, radiation, and/or some combination thereof) a vaporizable material to provide an inhalable dose of the material. The vaporizable material used with a vaporizer device can be contained within a cartridge (for example, a part of the vaporizer that contains the vaporizable material in a reservoir or other container) which can be refillable when empty, or disposable such that a new cartridge containing additional vaporizable material of a same or different type can be used). A vaporizer device can be a cartridge-using vaporizer device, a cartridge-less vaporizer device, or a multi-use vaporizer device capable of use with or without a cartridge. For example, a vaporizer device can include a heating chamber (for example, an oven or other region in which material is heated by a heating element) configured to receive a vaporizable material directly into the heating chamber, and/or a reservoir or the like for containing the vaporizable material. In some implementations, a vaporizer device can be configured for use with a liquid vaporizable material (for example, a carrier solution in which an active and/or inactive ingredient(s) are suspended or held in solution, or a liquid form of the vaporizable material itself), a paste, a wax, and/or a solid vaporizable material. A solid vaporizable material can include a plant material that emits some part of the plant material as the vaporizable material (for example, some part of the plant material remains as waste after the material is vaporized for inhalation by a user) or optionally can be a solid form of the vaporizable material itself, such that all of the solid material can eventually be vaporized for inhalation. A liquid vaporizable material can likewise be capable of being completely vaporized, or can include some portion of the liquid material that remains after all of the material suitable for inhalation has been vaporized.

Figure 1A:
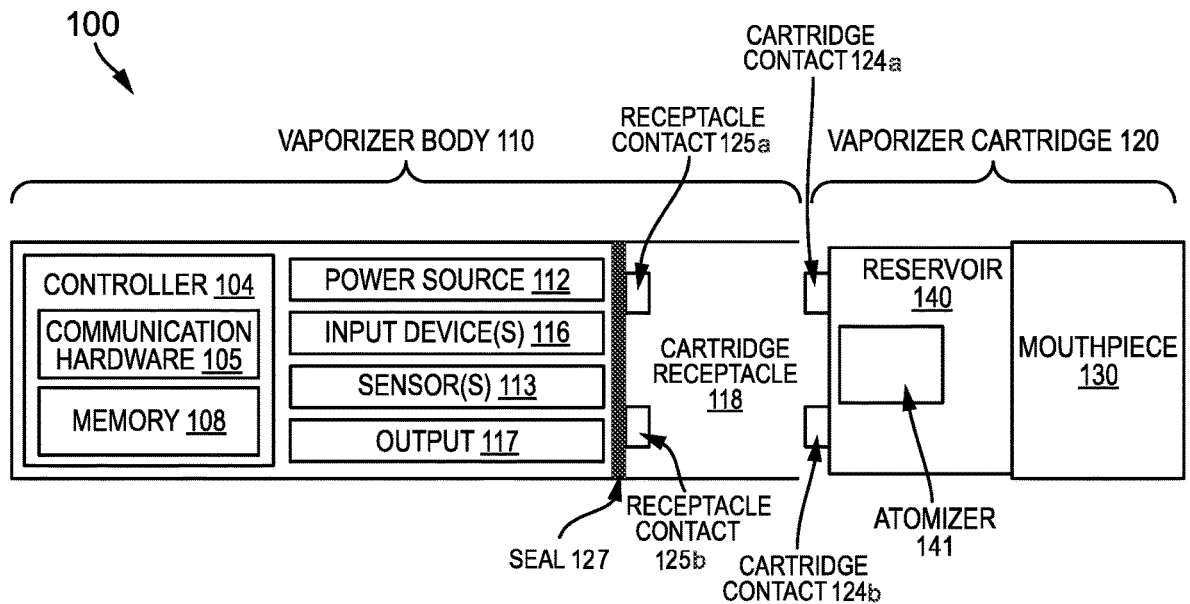
FIG. 1A is a block diagram of a vaporizer device.

Referring to the block diagram of FIG. 1A, a vaporizer device 100 can include a power source 112 (for example, a battery, which can be a rechargeable battery), and a controller 104 (for example, a processor, circuitry, etc. capable of executing logic) for controlling delivery of heat to an atomizer 141 to cause a vaporizable material 102 to be converted from a condensed form (such as a solid, a liquid, a solution, a suspension, a part of an at least partially unprocessed plant material, etc.) to the gas phase. The controller 104 can be part of one or more printed circuit boards (PCBs) consistent with certain implementations of the current subject matter. After conversion of the vaporizable material 102 to the gas phase, at least some of the vaporizable material 102 in the gas phase can condense to form particulate matter in at least a partial local equilibrium with the gas phase as part of an aerosol, which can form some or all of an inhalable dose provided by the vaporizer device 100 during a user's puff or draw on the vaporizer device 100. It should be appreciated that the interplay between gas and condensed phases in an aerosol generated by a vaporizer device 100 can be complex and dynamic, due to factors such as ambient temperature, relative humidity, chemistry, flow conditions in airflow paths (both inside the vaporizer and in the airways of a human or other animal), and/or mixing of the vaporizable material 102 in the gas phase or in the aerosol phase with other air streams, which can affect one or more physical parameters of an aerosol. In some vaporizer devices, and particularly for vaporizer devices configured for delivery of volatile vaporizable materials, the inhalable dose can exist predominantly in the gas phase (for example, formation of condensed phase particles can be very limited).

The atomizer 141 in the vaporizer device 100 can be configured to vaporize a vaporizable material 102. The vaporizable material 102 can be a liquid. Examples of the vaporizable material 102 include neat liquids, suspensions, solutions, mixtures, and/or the like. The atomizer 141 can include a wicking element (i.e., a wick) configured to convey an amount of the vaporizable material 102 to a part of the atomizer 141 that includes a heating element (not shown in FIG. 1A).

For example, the wicking element can be configured to draw the vaporizable material 102 from a reservoir 140 configured to contain the vaporizable material 102, such that the vaporizable material 102 can be vaporized by heat delivered from a heating element. The wicking element can also optionally allow air to enter the reservoir 140 and replace the volume of vaporizable material 102 removed. In some implementations of the current subject matter, capillary action can pull vaporizable material 102 into the wick for vaporization by the heating element, and air can return to the reservoir 140 through the wick to at least partially equalize pressure in the reservoir 140. Other methods of allowing air back into the reservoir 140 to equalize pressure are also within the scope of the current subject matter. Other methods of drawing vaporizable material 102 into the wick for vaporization by the heating element are also within the scope of the current subject matter.

As used herein, the terms "wick" or "wicking element" include any material capable of causing fluid motion via capillary pressure or via diffusion. A wick may transport a vaporizable material from a reservoir or storage compartment to an atomizer, which can vaporize the vaporizable material.

The heating element can include one or more of a conductive heater, a radiative heater, and/or a convective heater. One type of heating element is a resistive heating element, which can include a material (such as a metal or alloy, for example a nickel-chromium alloy, or a non-metallic resistor) configured to dissipate electrical power in the form of heat when electrical current is passed through one or more resistive segments of the heating element. In some implementations of the current subject matter, the atomizer 141 can include a heating element which includes a resistive coil or other heating element wrapped around, positioned within, integrated into a bulk shape of, pressed into thermal contact with, or otherwise arranged to deliver heat to a wicking element, to cause the vaporizable material 102 drawn from the reservoir 140 by the wicking element to be vaporized for subsequent inhalation by a user in a gas and/or a condensed (for example, aerosol particles or droplets) phase. Other wicking elements, heating elements, and/or atomizer assembly configurations are also possible.

Certain vaporizer devices may, additionally or alternatively, be configured to create an inhalable dose of the vaporizable material 102 in the gas phase and/or aerosol phase via heating of the vaporizable material 102. The vaporizable material 102 can be a solid-phase material (such as a wax or the like) or plant material (for example, tobacco leaves and/or parts of tobacco leaves). In such vaporizer devices, a resistive heating element can be part of, or otherwise incorporated into or in thermal contact with, the walls of an oven or other heating chamber into which the vaporizable material 102 is placed. Alternatively, a resistive heating element or elements can be used to heat air passing through or past the vaporizable material 102, to cause convective heating of the vaporizable material 102. In still other examples, a resistive heating element or elements can be disposed in intimate contact with plant material such that direct conductive heating of the plant material occurs from within a mass of the plant material, as opposed to only by conduction inward from walls of an oven.

The heating element can be activated in association with a user puffing (i.e., drawing, inhaling, etc.) on a mouthpiece 130 of the vaporizer device 100 to cause air to flow from an air inlet, along an airflow path that passes the atomizer 141 (i.e., wicking element and heating element). Optionally, air can flow from an air inlet through one or more condensation areas or chambers, to an air outlet in the mouthpiece 130. Incoming air moving along the airflow path moves over or through the atomizer 141, where vaporizable material 102 in the gas phase is entrained into the air. The heating element can be activated via the controller 104, which can optionally be a part of a vaporizer body 110 as discussed herein, causing current to pass from the power source 112 through a circuit including the resistive heating element, which is optionally part of a vaporizer cartridge 120 as discussed herein. As noted herein, the entrained vaporizable material 102 in the gas phase can condense as it passes through the remainder of the airflow path such that an inhalable dose of the vaporizable material 102 in an aerosol form can be delivered from the air outlet (for example, the mouthpiece 130) for inhalation by a user.

Activation of the heating element can be caused by automatic detection of a puff based on one or more signals generated by one or more of a sensor 113. The sensor 113 and the signals generated by the sensor 113 can include one or more of: a pressure sensor or sensors disposed to detect pressure along the airflow path relative to ambient pressure (or optionally to measure changes in absolute pressure), a motion sensor or sensors (for example, an accelerometer) of the vaporizer device 100, a flow sensor or sensors of the vaporizer device 100, a capacitive lip sensor of the vaporizer device 100, detection of interaction of a user with the vaporizer device 100 via one or more input devices 116 (for example, buttons or other tactile control devices of the vaporizer device 100), receipt of signals from a computing device in communication with the vaporizer device 100, and/or via other approaches for determining that a puff is occurring or imminent.

As discussed herein, the vaporizer device 100 consistent with implementations of the current subject matter can be configured to connect (such as, for example, wirelessly or via a wired connection) to a computing device (or optionally two or more devices) in communication with the vaporizer device 100. To this end, the controller 104 can include communication hardware 105. The controller 104 can also include a memory 108. The communication hardware 105 can include firmware and/or can be controlled by software for executing one or more cryptographic protocols for the communication.

A computing device can be a component of a vaporizer system that also includes the vaporizer device 100, and can include its own hardware for communication, which can establish a wireless communication channel with the communication hardware 105 of the vaporizer device 100. For example, a computing device used as part of a vaporizer system can include a general-purpose computing device (such as a smartphone, a tablet, a personal computer, some other portable device such as a smartwatch, or the like) that executes software to produce a user interface for enabling a user to interact with the vaporizer device 100. In other implementations of the current subject matter, such a device used as part of a vaporizer system can be a dedicated piece of hardware such as a remote control or other wireless or wired device having one or more physical or soft (i.e., configurable on a screen or other display device and selectable via user interaction with a touch-sensitive screen or some other input device like a mouse, pointer, trackball, cursor buttons, or the like) interface controls. The vaporizer device 100 can also include one or more outputs 117 or devices for providing information to the user. For example, the outputs 117 can include one or more light emitting diodes (LEDs) configured to provide feedback to a user based on a status and/or mode of operation of the vaporizer device 100.

In the example in which a computing device provides signals related to activation of the resistive heating element, or in other examples of coupling of a computing device with the vaporizer device 100 for implementation of various control or other functions, the computing device executes one or more computer instruction sets to provide a user interface and underlying data handling. In one example, detection by the computing device of user interaction with one or more user interface elements can cause the computing device to signal the vaporizer device 100 to activate the heating element to reach an operating temperature for creation of an inhalable dose of vapor/aerosol. Other functions of the vaporizer device 100 can be controlled by interaction of a user with a user interface on a computing device in communication with the vaporizer device 100.

The temperature of a resistive heating element of the vaporizer device 100 can depend on a number of factors, including an amount of electrical power delivered to the resistive heating element and/or a duty cycle at which the electrical power is delivered, conductive heat transfer to other parts of the vaporizer device 100 and/or to the environment, latent heat losses due to vaporization of the vaporizable material 102 from the wicking element and/or the atomizer 141 as a whole, and convective heat losses due to airflow (i.e., air moving across the heating element or the atomizer 141 as a whole when a user inhales on the vaporizer device 100). As noted herein, to reliably activate the heating element or heat the heating element to a desired temperature, the vaporizer device 100 may, in some implementations of the current subject matter, make use of signals from the sensor 113 (for example, a pressure sensor) to determine when a user is inhaling. The sensor 113 can be positioned in the airflow path and/or can be connected (for example, by a passageway or other path) to an airflow path containing an inlet for air to enter the vaporizer device 100 and an outlet via which the user inhales the resulting vapor and/or aerosol such that the sensor 113 experiences changes (for example, pressure changes) concurrently with air passing through the vaporizer device 100 from the air inlet to the air outlet. In some implementations of the current subject matter, the heating element can be activated in association with a user's puff, for example by automatic detection of the puff, or by the sensor 113 detecting a change (such as a pressure change) in the airflow path.

The sensor 113 can be positioned on or coupled to (i.e., electrically or electronically connected, either physically or via a wireless connection) the controller 104 (for example, a printed circuit board assembly or other type of circuit board). To take measurements accurately and maintain durability of the vaporizer device 100, it can be beneficial to provide a seal 127 resilient enough to separate an airflow path from other parts of the vaporizer device 100. The seal 127, which can be a gasket, can be configured to at least partially surround the sensor 113 such that connections of the sensor 113 to the internal circuitry of the vaporizer device 100 are separated from a part of the sensor 113 exposed to the airflow path. In an example of a cartridge-based vaporizer, the seal 127 can also separate parts of one or more electrical connections between the vaporizer body 110 and the vaporizer cartridge 120. Such arrangements of the seal 127 in the vaporizer device 100 can be helpful in mitigating against potentially disruptive impacts on vaporizer components resulting from interactions with environmental factors such as water in the vapor or liquid phases, other fluids such as the vaporizable material 102, etc., and/or to reduce the escape of air from the designated airflow path in the vaporizer device 100. Unwanted air, liquid or other fluid passing and/or contacting circuitry of the vaporizer device 100 can cause various unwanted effects, such as altered pressure readings, and/or can result in the buildup of unwanted material, such as moisture, excess vaporizable material 102, etc., in parts of the vaporizer device 100 where they can result in poor pressure signal, degradation of the sensor 113 or other components, and/or a shorter life of the vaporizer device 100. Leaks in the seal 127 can also result in a user inhaling air that has passed over parts of the vaporizer device 100 containing, or constructed of, materials that may not be desirable to be inhaled.

In some implementations, the vaporizer body 110 includes the controller 104, the power source 112 (for example, a battery), one more of the sensor 113, charging contacts (such as those for charging the power source 112), the seal 127, and a cartridge receptacle 118 configured to receive the vaporizer cartridge 120 for coupling with the vaporizer body 110 through one or more of a variety of attachment structures. In some examples, the vaporizer cartridge 120 includes the reservoir 140 for containing the vaporizable material 102, and the mouthpiece 130 has an aerosol outlet for delivering an inhalable dose to a user. The vaporizer cartridge 120 can include the atomizer 141 having a wicking element and a heating element. Alternatively, one or both of the wicking element and the heating element can be part of the vaporizer body 110. In implementations in which any part of the atomizer 141 (i.e., heating element and/or wicking element) is part of the vaporizer body 110, the vaporizer device 100 can be configured to supply vaporizable material 102 from the reservoir 140 in the vaporizer cartridge 120 to the part(s) of the atomizer 141 included in the vaporizer body 110.

Cartridge-based configurations for the vaporizer device 100 that generate an inhalable dose of a vaporizable material 102 that is not a liquid, via heating of a non-liquid material, are also within the scope of the current subject matter. For example, the vaporizer cartridge 120 can include a mass of a plant material that is processed and formed to have direct contact with parts of one or more resistive heating elements, and the vaporizer cartridge 120 can be configured to be coupled mechanically and/or electrically to the vaporizer body 110 that includes the controller 104, the power source 112, and one or more receptacle contacts 125a and 125b configured to connect to one or more corresponding cartridge contacts 124a and 125b and complete a circuit with the one or more resistive heating elements.

In an embodiment of the vaporizer device 100 in which the power source 112 is part of the vaporizer body 110, and a heating element is disposed in the vaporizer cartridge 120 and configured to couple with the vaporizer body 110, the vaporizer device 100 can include electrical connection features (for example, means for completing a circuit) for completing a circuit that includes the controller 104 (for example, a printed circuit board, a microcontroller, or the like), the power source 112, and the heating element (for example, a heating element within the atomizer 141). These features can include one or more contacts (referred to herein as cartridge contacts 124a and 124b) on a bottom surface of the vaporizer cartridge 120 and at least two contacts (referred to herein as receptacle contacts 125a and 125b) disposed near a base of the cartridge receptacle 118 of the vaporizer device 100 such that the cartridge contacts 124a and 124b and the receptacle contacts 125a and 125b make electrical connections when the vaporizer cartridge 120 is inserted into and coupled with the cartridge receptacle 118. The circuit completed by these electrical connections can allow delivery of electrical current to a heating element and can further be used for additional functions, such as measuring a resistance of the heating element for use in determining and/or controlling a temperature of the heating element based on a thermal coefficient of resistivity of the heating element.

In some implementations of the current subject matter, the cartridge contacts 124a and 124b and the receptacle contacts 125a and 125b can be configured to electrically connect in either of at least two orientations. In other words, one or more circuits necessary for operation of the vaporizer device 100 can be completed by insertion of the vaporizer cartridge 120 into the cartridge receptacle 118 in a first rotational orientation (around an axis along which the vaporizer cartridge 120 is inserted into the cartridge receptacle 118 of the vaporizer body 110) such that the cartridge contact 124a is electrically connected to the receptacle contact 125a and the cartridge contact 124b is electrically connected to the receptacle contact 125b. Furthermore, the one or more circuits necessary for operation of the vaporizer device 100 can be completed by insertion of the vaporizer cartridge 120 in the cartridge receptacle 118 in a second rotational orientation such cartridge contact 124a is electrically connected to the receptacle contact 125*b* and cartridge contact 124*b* is electrically connected to the receptacle contact 125*a*.

In one example of an attachment structure for coupling the vaporizer cartridge 120 to the vaporizer body 110, the vaporizer body 110 includes one or more detents (for example, dimples, protrusions, etc.) protruding inwardly from an inner surface of the cartridge receptacle 118, additional material (such as metal, plastic, etc.) formed to include a portion protruding into the cartridge receptacle 118, and/or the like. One or more exterior surfaces of the vaporizer cartridge 120 can include corresponding recesses (not shown in FIG. 1A) that can fit and/or otherwise snap over such detents or protruding portions when the vaporizer cartridge 120 is inserted into the cartridge receptacle 118 on the vaporizer body 110. When the vaporizer cartridge 120 and the vaporizer body 110 are coupled (e.g., by insertion of the vaporizer cartridge 120 into the cartridge receptacle 118 of the vaporizer body 110), the detents or protrusions of the vaporizer body 110 can fit within and/or otherwise be held within the recesses of the vaporizer cartridge 120, to hold the vaporizer cartridge 120 in place when assembled. Such an assembly can provide enough support to hold the vaporizer cartridge 120 in place to ensure good contact between the cartridge contacts 124*a* and 124*b* and the receptacle contacts 125*a* and 125*b*, while allowing release of the vaporizer cartridge 120 from the vaporizer body 110 when a user pulls with reasonable force on the vaporizer cartridge 120 to disengage the vaporizer cartridge 120 from the cartridge receptacle 118.

In some implementations, the vaporizer cartridge 120, or at least an insertable end 122 of the vaporizer cartridge 120 configured for insertion in the cartridge receptacle 118, can have a non-circular cross section transverse to the axis along which the vaporizer cartridge 120 is inserted into the cartridge receptacle 118. For example, the non-circular cross section can be approximately rectangular, approximately elliptical (i.e., have an approximately oval shape), non-rectangular but with two sets of parallel or approximately parallel opposing sides (i.e., having a parallelogram-like shape), or other shapes having rotational symmetry of at least order two. In this context, approximate shape indicates that a basic likeness to the described shape is apparent, but that sides of the shape in question need not be completely linear and vertices need not be completely sharp. Rounding of both or either of the edges or the vertices of the cross-sectional shape is contemplated in the description of any non-circular cross section referred to herein.

The cartridge contacts 124*a* and 124*b* and the receptacle contacts 125*a* and 125*b* can take various forms. For example, one or both sets of contacts can include conductive pins, tabs, posts, receiving holes for pins or posts, or the like. Some types of contacts can include springs or other features to facilitate better physical and electrical contact between the contacts on the vaporizer cartridge 120 and the vaporizer body 110. The electrical contacts can optionally be gold-plated, and/or include other materials.

Figure 1B:
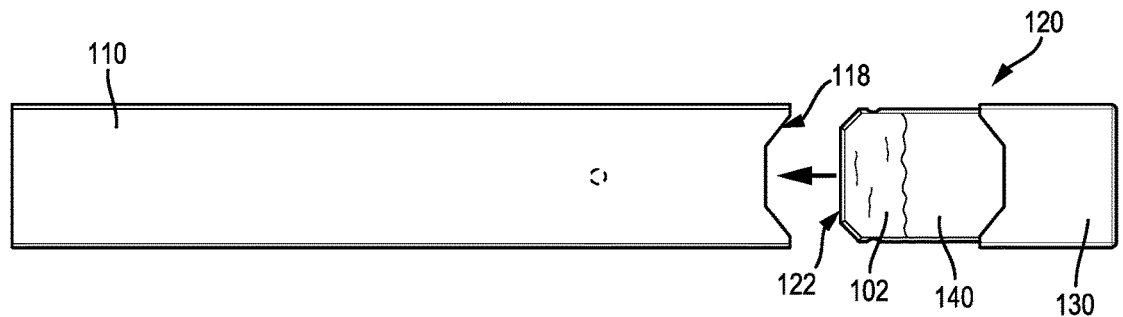
FIG. 1B is a schematic representation of a vaporizer device and vaporizer cartridge.

FIG. 1B illustrates an embodiment of the vaporizer body 110 and the cartridge receptacle 118 into which the vaporizer cartridge 120 can be releasably inserted. FIG. 1B shows a top view of the vaporizer device 100 illustrating the vaporizer cartridge 120 positioned for insertion into the vaporizer body 110. When a user puffs on the vaporizer device 100, air can pass between an outer surface of the vaporizer cartridge 120 and an inner surface of the cartridge receptacle 118 on the vaporizer body 110. Air can then be drawn into the insertable end 122 of the cartridge, through the vaporization chamber that includes or contains the heating element and wick, and out through an outlet of the mouthpiece 130 for delivery of the inhalable aerosol to a user. The reservoir 140 of the vaporizer cartridge 120 can be formed in whole or in part from translucent material such that a level of the vaporizable material 102 is visible within the vaporizer cartridge 120. The mouthpiece 130 can be a separable component of the vaporizer cartridge 120 or can be integrally formed with other component(s) of the vaporizer cartridge 120 (for example, formed as a unitary structure with the reservoir 140 and/or the like).

Further to the discussion above regarding the electrical connections between the vaporizer cartridge 120 and the vaporizer body 110 being reversible such that at least two rotational orientations of the vaporizer cartridge 120 in the cartridge receptacle 118 are possible, in some embodiments of the vaporizer device 100, the shape of the vaporizer cartridge 120, or at least a shape of the insertable end 122 of the vaporizer cartridge 120 that is configured for insertion into the cartridge receptacle 118, can have rotational symmetry of at least order two. In other words, the vaporizer cartridge 120 or at least the insertable end 122 of the vaporizer cartridge 120 can be symmetrical upon a rotation of 180° around an axis along which the vaporizer cartridge 120 is inserted into the cartridge receptacle 118. In such a configuration, the circuitry of the vaporizer device 100 can support identical operation regardless of which symmetrical orientation of the vaporizer cartridge 120 occurs.

Figure 1C:
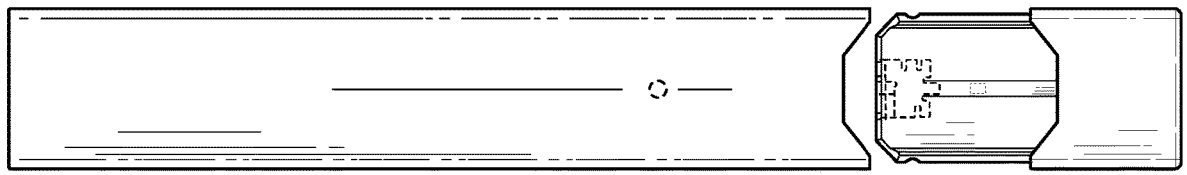
FIG. 1C is a front view of a vaporizer device and an embodiment of a vaporizer cartridge.
Figure 1D:
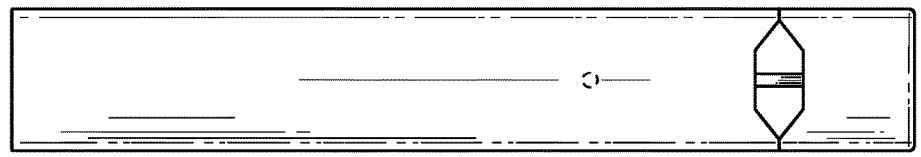
FIG. 1D is a front view of a vaporizer cartridge coupled to a vaporizer device.

FIGS. 1C-1D illustrate example features that can be included in embodiments of the vaporizer device 100 consistent with implementations of the current subject matter. FIGS. 1C and 1D show top views of an example of the vaporizer device 100 before (FIG. 1C) and after (FIG. 1D) connecting the vaporizer cartridge 120 to the vaporizer body 110.

Figure 1E:
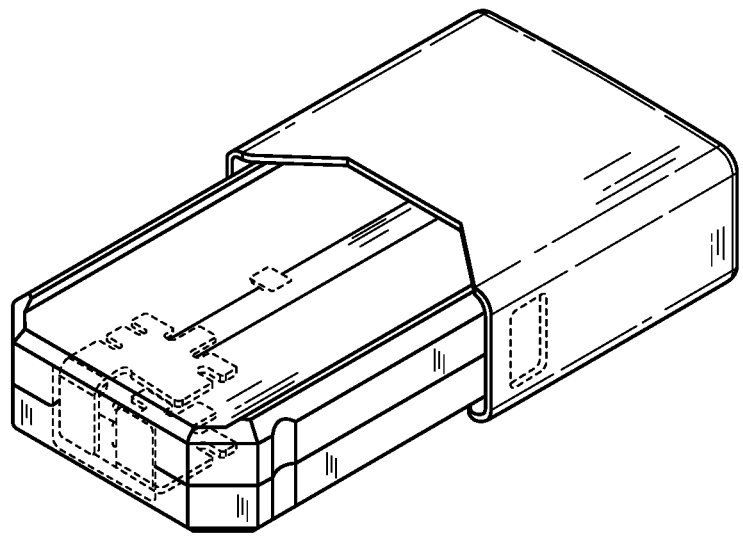
FIG. 1E is a perspective view of a vaporizer cartridge.

FIG. 1E illustrates a perspective view of one variation of the vaporizer cartridge 120 holding the vaporizable material 102. Any appropriate vaporizable material 102 can be contained within the vaporizer cartridge 120 (for example, within the reservoir 140), including solutions of nicotine or other organic materials.

Figure 1F:
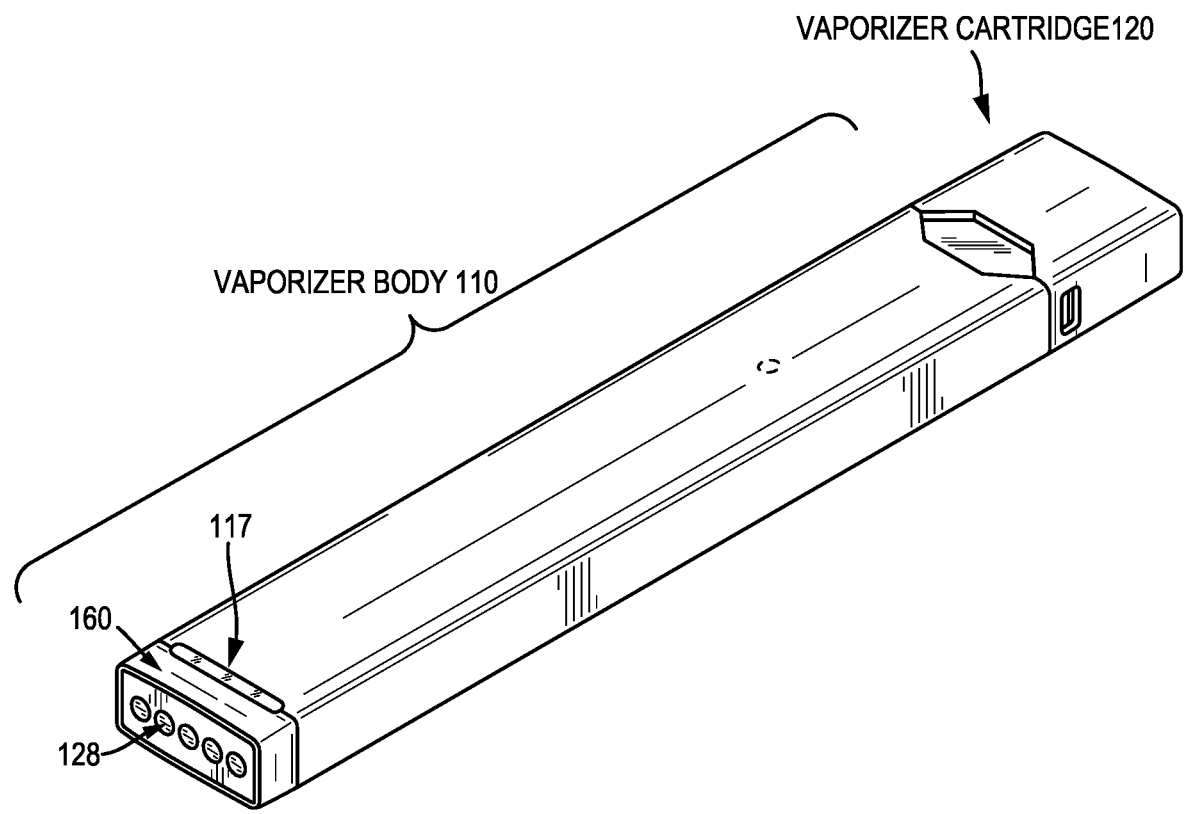
FIG. 1F is a perspective view of another embodiment of a vaporizer cartridge coupled to a vaporizer device.

FIG. 1F shows a perspective view of another example of a vaporizer device 100 including a vaporizer body 110 coupled to a separable vaporizer cartridge 120. As illustrated, the vaporizer device 100 can include one or more outputs 117 (for example, LEDs) configured to provide information to a user based on a status, mode of operation, and/or the like, of the vaporizer device 100. In some aspects, the one or more outputs 117 can include a plurality of LEDs (i.e., two, three, four, five, or six LEDs). The one or more outputs 117 (i.e., each individual LED) can be configured to display light in one or more colors (for example, white, red, blue, green, yellow, etc.). The one or more outputs 117 can be configured to display different light patterns (for example, by illuminating specific LEDs, varying a light intensity of one or more of the LEDs over time, illuminating one or more LEDs with a different color, and/or the like) to indicate different statuses, modes of operation, and/or the like of the vaporizer device 100. In some implementations, the one or more outputs 117 can be proximal to and/or at least partially disposed within a bottom end region 160 of the vaporizer device 100. The vaporizer device 100 may, additionally or alternatively, include externally accessible charging contacts 128, which can be proximate to and/or at least partially disposed within the bottom end region 160 of the vaporizer device 100.

Figure 2:
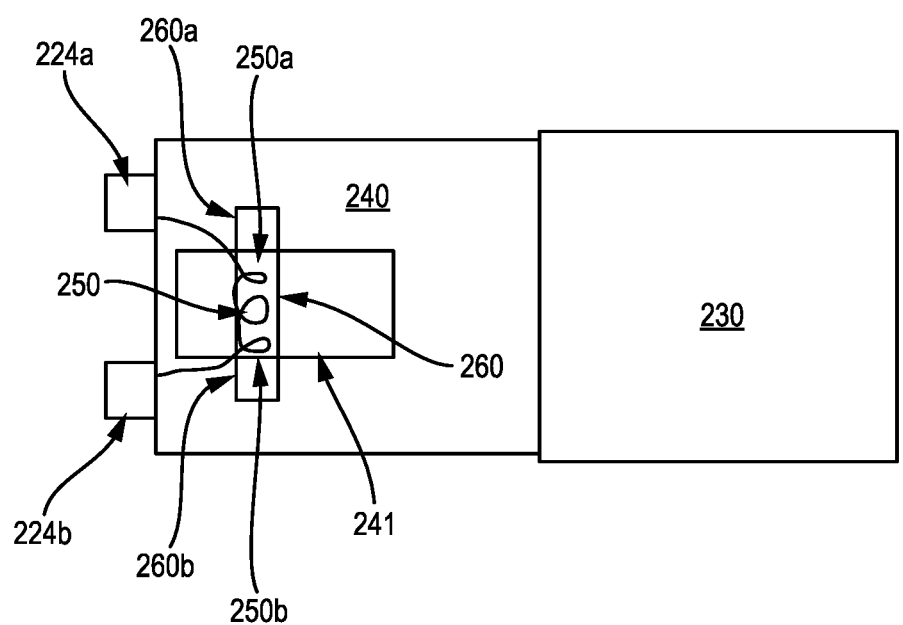
FIG. 2 is a block diagram of a vaporizer cartridge, including the heating element and gel wick.

FIG. 2 is a block diagram of a vaporizer cartridge, including the heating element 250 and gel wick 260. FIG. 2 illustrates an embodiment of the vaporizer cartridge 220 which can include a reservoir 240, an atomizer 241, a heating element 250, and a gel wick 260.

In some implementations of the current subject matter, the atomizer 241 can include a gel wick (i.e. wicking element) 260 configured to convey an amount of the vaporizable material from the reservoir 240 to a part of the atomizer 241 that includes a heating element 250. The atomizer 241 can be configured to vaporize a vaporizable material to generate an inhalable aerosol.

In some implementations, the heating element 250 may be embedded within the gel wick 260. In some implementations, the gel wick 260 can be located inside the heating element (e.g., a resistive heating coil) 250. The heating element 250 can be a wire or a mesh, composed of, for example, a nickel and chrome alloy.

The gel wick 260 includes a gel wick first end 260a and a gel wick second end 260b, which are each disposed within the reservoir 240. The gel wick 260 is configured to draw the vaporizable material from the reservoir 240 that is configured to store the vaporizable material, such that the vaporizable material can be vaporized by heat selectively delivered from a heating element 250. The gel wick 260 is configured to draw the vaporizable material from the reservoir 240 to the atomizer 241 by diffusion, for vaporization by the heating element 250.

The heating element 250 includes a heating element first end 250a and a heating element second end 250b, which are electrically coupled to the first cartridge contact 224a and the second cartridge contact 224b respectively. In some implementations of the current subject matter, the atomizer 241 can include a heating element 250 which includes a resistive coil or other heating element 250 wrapped around, positioned within, integrated into a bulk shape of, pressed into thermal contact with, or otherwise arranged to deliver heat to a gel wick 260, to cause the vaporizable material drawn from the reservoir 240 by the gel wick 260 to be vaporized for subsequent inhalation by a user in a gas and/or a condensed (for example, aerosol particles or droplets) phase. Other wicking elements, heating elements, and/or atomizer assembly configurations are also possible.

Figure 3:
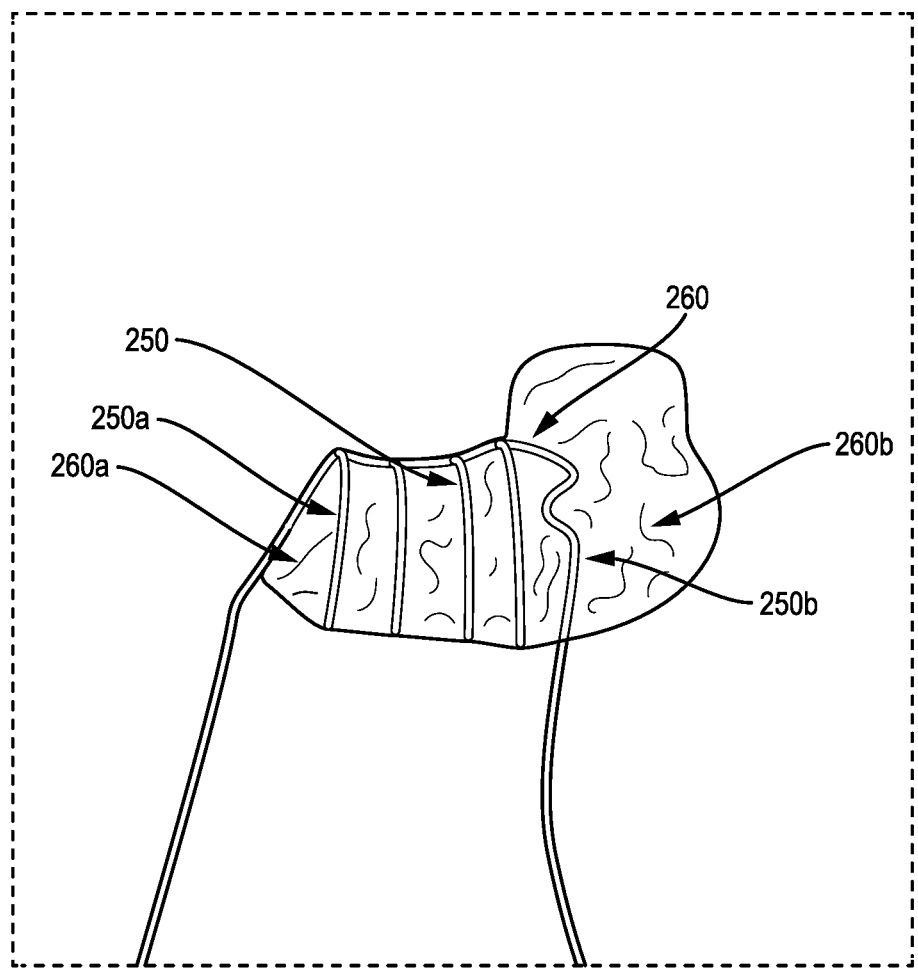
FIG. 3 shows an actual gel wick formed around a heating element.

FIG. 3 shows an example of a gel wick 260 formed around a heating element 250 having a heating element first end 250a and a heating element second end 250b. In embodiments, a gel wick 260 can include a superabsorbent polymer. In embodiments, a gel wick 260 can include a chemically-crosslinked polysaccharide or a graft polysaccharide-polyacrylonitrile. In embodiments, a gel wick 260 can include an aqueous polysaccharide-based gellant system, which can include a polysaccharide and a gel modifier. In embodiments, a gel wick 260 can include a sol-gel matrix. Gel wick 260 includes a gel wick first end 260a and a gel wick second end 260b.

Various embodiments of the wick, such as various embodiments of a gel wick, are disclosed in greater detail below. Embodiments of the gel wick can be implemented in a variety of cartridges, including vaporizer cartridge 220 for improving the efficiency and effectiveness of vaporizing one or more vaporizable materials with a vaporizer.

In embodiments, the gel wick 260 may provide a variety of benefits, including allowing for a more flexible design of the wicking element. For example, the shape and size of a gel wick 260 are not limited. In embodiments, the gel wick 260 may be deposited on the heating element 250 in any shape or form. Further, the heating element 250 is not required to be a wire, for example, it can be a mesh design.

In embodiments, the gel wick 260 may provide thermal benefits including better thermal stability and less charring. In embodiments, the gel wick 260 may provide other benefits including uptake of vaporizable material based on diffusion mechanism, unlike porosity or capillary action, so leakages can be minimized since gels will not accept more than the required amount of water into their 3D structure. In embodiments, the gel wick 260 may provide better absorption capacities that allow for a reduction of the size of the wicking elements and energy required, thus extending battery life or reducing energy consumption of a vaporizer device.

Gels are water-soluble thus allowing to replace typical carrier systems for vaporizable materials, e.g. a mixture of propylene glycol (PG) and vegetable glycerin (VG), with water. Moreover, the lower boiling point of water may allow for repeated vaporization and condensation at lower temperatures, which may result in reductions or even elimination of Harmful and Potentially Harmful Constituents (HPHC) that may be generated by conventional vaporizers.

In embodiments, a gel wick 260 may include a superabsorbent polymer. The gel wicks advantageously may provide an opportunity to move away from typical propylene glycol (PG) and vegetable glycerin (VG) (PG/VG) based carriers by reducing or eliminating PG/VG and using water as a primary carrier.

Performance of the gel wicks herein may improve product delivery consistency by removing variation due to wick behavior when using liquids that have varying physical properties that can change as a function of temperature. The gel wicks disclosed herein may be less prone to leakage problems that occur with conventional wicks employed in vapor-generating devices.

The gel wicks disclosed herein may be composed of superabsorbent polymers (SAPs) such as polyacrylamide, poly (methyl acrylate) and sodium polyacrylate, although polysaccharide-based gels may be employed in other embodiments. In embodiments, the compositions disclosed herein may be biodegradable, and environmentally safe. In embodiments, gel wicks can break down over time into nitrogen, carbon dioxide, and water. SAPs can absorb a wide variety of liquid solutions including, in some embodiments, aqueous and organic-based solutions. In embodiments, SAPs' ability to absorb liquid can be modulated based on, for example, the ionic concentration of the solution and degree of crosslinking, if any. Such flexibility in tuning liquid absorption can facilitate precision loading of active ingredient materials into the superabsorbent polymer gel wicks.

In embodiments, a gel wick comprising a superabsorbent polymer is disclosed. Superabsorbent polymers include polymers of acrylic acid and its derivatives as well as polysaccharide-graft co-polymers. The superabsorbent polymer-based gel wick may be a hydrogel in embodiments, having water as its principle liquid phase component within the gel network. In embodiments, the superabsorbent polymer-based gel wick may be a hydrogel with an organic liquid phase co-solvent in smaller quantities than water. For example, the hydrogel may be able to absorb and diffuse water-based carrier systems for vaporizable materials. In embodiments, the hydrogel may be able to absorb and diffuse carriers, for vaporizable materials, such as propylene glycol, vegetable glycerin, and mixtures thereof. In embodiments, the gel wicks disclosed herein may be classified as organo-gel wicks where the predominant liquid phase component of the gel system is an organic liquid.

In embodiments, the superabsorbent polymer may be a polymer product prepared from monomers selected from the group consisting of an acrylic acid, a salt of acrylic acid, acrylamide, and/or 2-hydroxyethyl methacrylate (HEMA), including combinations thereof. In embodiments, the superabsorbent polymer is a polymer product prepared from a plurality of different monomers. In embodiments, the superabsorbent polymer is a polymer product prepared from a single species of monomer. In embodiments, the superabsorbent polymer may be polyacrylic acid. In embodiments, the superabsorbent polymer may be a polyacrylic acid salt. In embodiments, the superabsorbent polymer may be polyacrylamide. In embodiments, the superabsorbent polymer is a product prepared from one or more monomers of formula (I):

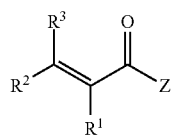

wherein $R^1$, $R^2$, and $R^3$ are independently hydrogen, fluorine or methyl and Z is selected from —OH, —OM, —NH$_2$, —NHMe and —NMe$_2$, wherein M is a metal salt (of the carboxylate group), including, without limitation, sodium or potassium salt.

In embodiments, the superabsorbent polymer is a polymer product prepared from a plurality of different monomers, wherein at least one monomer of the plurality of monomers is a monomer of Formula (I) wherein $R^1$, $R^2$, $R^3$ are each hydrogen and Z is NH$_2$. In embodiments, the superabsorbent polymer is a polymer product prepared from a single species of monomer, wherein the single species of monomer is a monomer of Formula (I) wherein $R^1$, $R^2$, $R^3$ are each hydrogen and Z is NH$_2$. In embodiments, the superabsorbent polymer is a polymer product prepared from a plurality of different monomers, wherein at least one monomer of the plurality of monomers is a monomer of Formula (I) wherein $R^1$, $R^2$, $R^3$ are each hydrogen and Z is OM, where M is a sodium salt. In embodiments, the superabsorbent polymer is a polymer product prepared from a single species of monomer, wherein the single species of monomer is a monomer of Formula (I) wherein $R^1$, $R^2$, $R^3$ are each hydrogen and Z is OM, where M is a sodium salt. In embodiments, the superabsorbent polymer is a polymer product prepared from a plurality of different monomers, wherein at least one monomer of the plurality of monomers is a monomer of Formula (I) wherein $R^1$, $R^2$, $R^3$ are each hydrogen and Z is OH. In embodiments, the superabsorbent polymer is a polymer product prepared from a single species of monomer, wherein single species of monomer is a monomer of Formula (I) wherein $R^1$, $R^2$, $R^3$ are each hydrogen and Z is OH.

In embodiments, the superabsorbent polymer is a homopolymer of one monomer of the above-mentioned acrylic acid or a derivative of acrylic acid. In embodiments, the homopolymer is polyacrylic acid. In embodiments, the homopolymer is polyacrylamide. In embodiments, the homopolymer is poly(methyl acrylate). In embodiments, the homopolymer is not crosslinked. In embodiments, the homopolymer is crosslinked, as described herein further below.

In embodiments, the superabsorbent polymer may be a random co-polymer of two or more monomers. In embodiments, the superabsorbent polymer is acrylic acid-acrylamide co-polymer. In embodiments, the superabsorbent polymer is acrylic acid-methyl acrylate co-polymer. In embodiments, the superabsorbent polymer is acrylic acid-acrylic acid salt-co-polymer. In embodiments, the superabsorbent polymer is acrylamide-methyl acrylate co-polymer. In embodiments, the superabsorbent polymer is acrylamide-acrylic acid salt co-polymer. In embodiments, the superabsorbent polymer is acrylic acid-acrylic acid salt-acrylamide co-polymer. In embodiments, the superabsorbent polymer is acrylic acid-acrylamide-methyl acrylate co-polymer. In embodiments, the superabsorbent polymer is acrylamide-methyl acrylate-acrylic acid salt co-polymer. In embodiments, the superabsorbent polymer is acrylic acid-acrylamide-methyl acrylate-acrylic acid salt co-polymer.

In embodiments, random co-polymers of two monomers can comprise the monomers in any desired ratio from 1:99 to 99:1 inclusive and any desired subrange of ratios in between, including fractions thereof. In embodiments, random co-polymers of two monomers can comprise the monomers in a ratio of 2:1. In embodiments, random co-polymers of two monomers can comprise the monomers in a ratio of 1:2. In embodiments, random co-polymers of two monomers can comprise the monomers in a ratio of 1:1. In embodiments, random co-polymers of two monomers can comprise the monomers in a ratio of 3:1. In embodiments, random co-polymers of two monomers can comprise the monomers in a ratio of 1:3. In embodiments, random co-polymers of two monomers can comprise the monomers in a ratio of 10:1. In embodiments, random co-polymers of two monomers can comprise the monomers in a ratio of 1:10.

In embodiments, the superabsorbent polymer may be in the form of block co-polymers, including A-B diblock and A-B-C triblock co-polymers. Block co-polymers are characterized by having blocks of repeating identical monomer units, but are co-polymers by virtue of having repeating blocks of a second repeating monomer unit within the polymer framework. In embodiments, the superabsorbent polymer is a block co-polymer comprising blocks of polyacrylic acid in a co-polymer with blocks of polyacrylamide. In embodiments, the superabsorbent polymer is a block co-polymer comprising blocks of acrylic acid salt in a co-polymer with blocks of polyacrylamide. In embodiments, the superabsorbent polymer is a block co-polymer comprising blocks of poly(methyl acrylate) in a co-polymer with blocks of polyacrylamide. Likewise, triblock co-polymers may comprise three different monomer blocks. In embodiments, the superabsorbent polymer is a block co-polymer comprising polyacrylic acid blocks along with poly(methyl acrylate) blocks and polyacrylamide blocks. Those skilled in the art will recognize that block co-polymers can be designed with varying ordering of blocks, for example, A-B-A-C-A-B-A-C, or A-C-B-A-B-C-A, where each block A, B, and C represent different polymer blocks of a single monomer type, such as A=polyacrylic acid block, B=poly(methyl acrylate) block, and C=polyacrylamide block. Accordingly, the superabsorbent polymers that are block co-polymers can order A, B, and C blocks in any desired order and combination.

In embodiments, acrylate-based superabsorbent polymers may be formed in the presence of a crosslinker. In embodiments, the crosslinker is N,N'-methylene bisacrylamide (MBA). In embodiments, the crosslinker is ethyleneglycol dimethacrylate (EGDMA). In embodiments, the crosslinker is 1,1,1-trimethylolpropane triacrylate (TMPTA). In embodiments, the crosslinker is tetraallyloxyethane (TAOE). In embodiments, the crosslinker may comprise a compound of formula II:

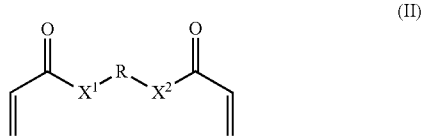

wherein R is $(CH_2)_n$, where n is an integer from 1 to 3, and $X^1$ and $X^2$ are independently O or NH. In embodiments, n is 1. In embodiments, n is 2. In embodiments, n is 3. In embodiments, $X^1$ is O. In embodiments, $X^1$ is NH. In embodiments, $X^2$ is O. In embodiments, $X^2$ is NH. In embodiments, $X^1$ is O and $X^2$ is NH. In embodiments, $X^1$ and $X^2$ are O. In embodiments, $X^1$ and $X^2$ are NH.

In embodiments, n is 1 and each X is O. In embodiments, n is 2 and each X is O. In embodiments, n is 3 and $X^1$ and $X^2$ are O. In embodiments, n is 1 and $X^1$ and $X^2$ are NH. In embodiments, n is 2 and $X^1$ and $X^2$ are NH. In embodiments, n is 3 and $X^1$ and $X^2$ are O. In embodiments, n is 1, $X^1$ is O and $X^2$ is NH. In embodiments, n is 2, $X^1$ is O and $X^2$ is NH. In embodiments, n is 3, $X^1$ is O and $X^2$ is NH.

In embodiments, the crosslinker may be present in and amount from about 1% to about 10% w/w of monomers. In embodiments, the crosslinker may be present in a range from 1 to 5%, or from 1 to 2%. In embodiments, the crosslinker may be present in an amount of about 1%. In embodiments, the crosslinker may be present in an amount of about 2%. In embodiments, the crosslinker may be present in an amount of about 3%. In embodiments, the crosslinker may be present in an amount of about 4%. In embodiments, the crosslinker may be present in an amount of about 5%. In embodiments, the crosslinker may be present in an amount of about 6%. In embodiments, the crosslinker may be present in an amount of about 7%. In embodiments, the crosslinker may be present in an amount of about 8%. In embodiments, the crosslinker may be present in an amount of about 9%. In embodiments, the crosslinker may be present in an amount of about 10%. In embodiments, the crosslinker may be present in an amount of any fractional amount from about 1% to about 10% w/w of monomers. Those skilled in the art will recognize that the degree of crosslinking relates to the amount that a given superabsorbent polymer can swell, with higher crosslinking associated with lower swelling capacity. Some crosslinking may be desirable to prevent dissolution of the polymer network. Crosslinking may be particularly important when employing charged monomer units such as acrylate anion.

In embodiments, crosslinking may comprise so called "bulk" or "core" crosslinking in which crosslinking is effected during the polymerization process. In other embodiments, crosslinking may be comprise "surface" crosslinking, which is crosslinking that occurs after the main polymerization process is complete. Accordingly, the crosslinking that occurs in surface crosslinking takes place predominantly at the surface of the polymer. Surface crosslinking is generally performed on dried polymer material with a crosslinking solution. A typical process may employ crosslinking with crosslinkers that have at least two functional groups. For example, glycerin and other polyhydric alcohols may be used to crosslink surface carboxyl groups on a polyacrylate polymer. When employing surface crosslinking as a structural element of the SAP, the initial core/bulk polymerization may be "light," e.g., about 0.005 to about 1.0 mole percent based on moles of monomer employed.

In embodiments, crosslinking may comprise a combination of core/bulk crosslinking and surface crosslinking. For example, light crosslinking may be employed during monomer polymerization, followed by surface crosslinking after the initial polymer is formed. The combined effect of bulk crosslinking and surface crosslinking is a structure that has a lightly crosslinked core and surface have a higher crosslinking density. By employing both crosslinking techniques the superabsorbent polymer can be highly tailored to specific properties, such as maximum volume liquid uptake of the final superabsorbent polymer. This can be useful for highly controlling the amount of a solution (such as a nicotine-containing solution) is absorbed.

In embodiments, the superabsorbent polymer may also comprise graft-copolymers. In embodiments, the superabsorbent polymer may comprise a chemically-crosslinked polysaccharide or a graft polysaccharide-polyacrylonitrile. In embodiments, the polysaccharide in crosslinked or graft systems is cellulose. In embodiments, the polysaccharide in crosslinked or graft systems is starch. In embodiments, the polysaccharide in crosslinked or graft systems is chitosan. In embodiments, the polysaccharide in crosslinked or graft systems is a gelatin. In embodiments, the polysaccharide in crosslinked or graft systems is xanthan gum. In embodiments, the polysaccharide in crosslinked or graft systems is guar gum. In embodiments, the polysaccharide in crosslinked or graft systems is an alginate. In embodiments, the polysaccharide in crosslinked or graft systems is carboxymethylcellulose, and the like. Crosslinkers with polysaccharides may include any difunctional organic molecules that have at least two electrophilic centers. In embodiments, the crosslinker is a divinyl sulfones. In embodiments, the crosslinker is glyoxal. In embodiments, the crosslinker is epichlorohydrin. In embodiments, the crosslinker is $POCl_3$. In embodiments, the crosslinker is citric acid. In embodiments, the crosslinker is a glycerol, and the like. Those skilled in the art will appreciate that the selection of a particular linker may be guided by the selection of polysaccharide. For example, the polysaccharide carboxylmethyl cellulose may be crosslinked via its carboxyl functionality through ester formation with a diol containing organic linker, such as glycerol. Other polysaccharides may be O-linked to linking groups through polysaccharide hydroxyl functional groups using electrophilic reagents such as divinyl sulfone.

In embodiments, superabsorbent polymers may comprise a chemically modified starch and a cellulose and a polymer. In embodiments, superabsorbent polymers comprise chemically modified starch and cellulose and poly(vinyl alcohol) PVA polymer. In embodiments, superabsorbent polymers comprise chemically modified starch and cellulose and poly(ethylene oxide) PEO polymer. Each of these polymers are hydrophilic and have a high affinity for water. At low crosslinking, such as about 0.05 to about 1%, these polymers may swell in water but may not be water-soluble. Examples of water-soluble polysaccharides are starches, water-soluble celluloses and polygalactomannans. In embodiments, the starch is a natural starch. In embodiments, the starch is sweet potato starch. In embodiments, the starch is potato starch. In embodiments, the starch is wheat starch. In embodiments, the starch is corn starch. In embodiments, the starch is rice starch. In embodiments, the starch is tapioca starch, and the like. Processed or modified starches are also suitable. In embodiments, the starch is a dialdehyde starch. In embodiments, the starch is an alkyl-etherified starch. In embodiments, the starch is an allyl-etherified starch. In embodiments, the starch is an oxyalkylated starch. In embodiments, the starch is an aminoethyl-etherified starch. In embodiments, the starch is a cyanoethyl-etherified starch.

In embodiments, water-soluble celluloses useful in SAP structures are those obtained from such sources as wood, and the like, which are then derivatized to form hydroxyalkyl cellulose, carboxymethyl cellulose, methyl cellulose and the like. In embodiments, water-soluble celluloses useful in SAP structures are those obtained from such sources as stems, and the like, which are then derivatized to form hydroxyalkyl cellulose, carboxymethyl cellulose, methyl cellulose and the like. In embodiments, water-soluble celluloses useful in SAP structures are those obtained from such sources as bast. In embodiments, water-soluble celluloses useful in SAP structures are those obtained from such sources as seed fluffs, and the like which are then derivatized to form hydroxyalkyl cellulose, carboxymethyl cellulose, methyl cellulose and the like. Suitable polygalactomannans are guar gum and locust bean gums as well as the hydroxyalkyl, carboxyalkyl, and aminoalkyl derivatives.

In embodiments, the superabsorbent polymers disclosed herein may have a number average molecular weight ($M_n$) of at least about 50,000 daltons. In embodiments, the superabsorbent polymers disclosed herein may have a number average molecular weight ($M_n$) in a range from about 50,000 daltons to about 150,000 daltons. In embodiments, the superabsorbent polymers disclosed herein may have a number average molecular weight ($M_n$) in a range from about 80,000 daltons to about 150,000 daltons in embodiments. In embodiments, the superabsorbent polymers disclosed herein may have a number average molecular weight ($M_n$) in a range from about 90,000 daltons to about 120,000 daltons in embodiments. The number average molecular weight is the total weight of the sample divided by the number of molecules in the sample.

In embodiments, superabsorbent polymers disclosed herein may be characterized by physical properties including, without limitation, swellability, density, porosity and the like. Those skilled in the art will recognize that swellability may be a function of time. In embodiments, swelling may be in a range from about 100 g/g to about 300 g/g. In embodiments, the swell is about 120 minutes. In embodiments, the swelling is about 200 g/g. In embodiments, the swelling is about 100 g/g. In embodiments, the swelling is about 50 g/g. In embodiments, the swelling is about 20 g/g. In embodiments, the swelling is about 10 g/g. Those skilled in the art will recognize that the lower limit can be much lower than 100 g/g with, such as 50 g/g, or 20 g/g, or 10 g/g. The upper limit of swellability will depend on, inter alia, the degree of crosslinking and the length of time allowed for swelling. Accordingly, the swellability may be more than 300 g/g, such as 350 g/g or 400 g/g, depending on the particular structure of the superabsorbent polymer.

In embodiments, the density of the superabsorbent polymers disclosed herein may be in a range from about 0.5 g/cm$^3$ to about 1.5 g/cm$^3$. In embodiments, the density of the superabsorbent polymers disclosed herein may be in a range from about 0.5 g/cm$^3$ to about 1.3 g/cm$^3$. In embodiments, the density of the superabsorbent polymers disclosed herein may be in a range from about 0.5 g/cm$^3$ to about 1.0 g/cm$^3$. Density, like swellability may depend on, inter alia, the degree of crosslinking and the length of time allowed for swelling.

In embodiments, a gel wick 260 may include an aqueous polysaccharide-based gellant system comprising a polysaccharide and a gel modifier. In general, polysaccharide-based systems benefit from being classified as "generally regarded as safe" (GRAS) ingredients. Polysaccharides of a wide variety of structures give access to gels of differing strength (measurable as a viscosity, for example) and form, such as beads, paste-like materials, and bulk solid jelly-like masses. It will be appreciated by those skilled in the art that polysaccharide-based gels may be rationally designed to desired characteristics by controlling (i) types and concentrations of crosslinkers or other agents that impact supramolecular structuring of the polymer. It will be appreciated by those skilled in the art that polysaccharide-based gels may be rationally designed to desired characteristics by controlling (ii) the concentration of the polysaccharide. It will be appreciated by those skilled in the art that polysaccharide-based gels may be rationally designed to desired characteristics by controlling (iii) the size the polysaccharide particles prior to introduction to water or other solvent. It will be appreciated by those skilled in the art that polysaccharide-based gels may be rationally designed to desired characteristics by controlling (iv) the molecular weight of the polysaccharide. It will be appreciated by those skilled in the art that polysaccharide-based gels may be rationally designed to desired characteristics by controlling the (v) temperature. It will be appreciated by those skilled in the art that polysaccharide-based gels may be rationally designed to desired characteristics by controlling the (vi) pH It will be appreciated by those skilled in the art that polysaccharide-based gels may be rationally designed to desired characteristics by controlling (vii) any combination of factors (i) through (vi). In embodiments, the polysaccharide-based gel systems are specifically selected to not be thermoreversible. A thermoreversible gel may be a gel at ambient temperatures but may liquefy upon heating and return to gel form on cooling.

One or more features of polysaccharides selected for the gellant systems disclosed herein may be desirable including, without limitation, (i) the presence of a hydrophobic core. One or more features of polysaccharides selected for the gellant systems disclosed herein may be desirable including, without limitation (ii) the presence of a charged group in the polysaccharide backbone. One or more features of polysaccharides selected for the gellant systems disclosed herein may be desirable including, without limitation (iii) the degree of branching in the polysaccharide polymer. One or more features of polysaccharides selected for the gellant systems disclosed herein may be desirable including, without limitation, (iv) gelation at ambient temperatures. One or more features of polysaccharides selected for the gellant systems disclosed herein may be desirable including, without limitation (v) the facility with which the presence of crosslinkers can impact gel formation or modify gel viscosity.

In embodiments, the polysaccharide of the gellant system is selected from an alginic acid, a cellulose, a guar (galactomannan), a xanthan gum, an agar, a gellan, an amylose, a welan gum, a rhamsan, a carrageenan, a chitosan, a scleroglucan, a diutan gum, a pectin, a starch, derivatives thereof, or combinations thereof. In embodiments, the polysaccharide of the gellant system is an alginic acid. In embodiments, the polysaccharide of the gellant system is a cellulose. In embodiments, the polysaccharide of the gellant system is a guar (galactomannan). In embodiments, the polysaccharide of the gellant system is a xanthan gum. In embodiments, the polysaccharide of the gellant system is an agar. In embodiments, the polysaccharide of the gellant system is a gellan. In embodiments, the polysaccharide of the gellant system is an amylose. In embodiments, the polysaccharide of the gellant system is a welan. In embodiments, the polysaccharide of the gellant system is rhamsan. In embodiments, the polysaccharide of the gellant system is a carrageenan. In embodiments, the polysaccharide of the gellant system is a chitosan. In embodiments, the polysaccharide of the gellant system is a scleroglucan. In embodiments, the polysaccharide of the gellant system is a diutan gum. In embodiments, the polysaccharide of the gellant system is a pectin. In embodiments, the polysaccharide of the gellant system is a starch. In embodiments, the polysaccharide of the gellant system is a derivative of any of the polysaccharides disclosed herein. In embodiments, the polysaccharide of the gellant system is a combination of any of the polysaccharides disclosed herein.

In embodiments, alginic acids may be in salt form prior to gelation. In embodiments, alginic acid precursor for gel formation is a salt form selected from the group consisting of sodium alginate, ammonium alginate, and potassium alginate. Alginic acids have the general structure of formula (III):

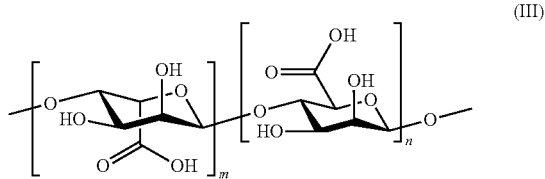

(III)

having repeating blocks of beta-D-mannuronate (M) and alpha-L-guluronate (G) and where m and n define a ratio of M to G of 1.6:1. In embodiments, m and n have a combined effect of providing a number resulting in a polymer with a weight average molecular weights ranging from about 1 Kdaltons to about 600 Kdaltons. In embodiments, m and n have a combined effect of providing a number resulting in a polymer with a weight average molecular weights ranging from about 5 Kdaltons to about 100 Kdaltons. In embodiments, m and n have a combined effect of providing a number resulting in a polymer with a weight average molecular weights ranging from about 6 Kdaltons to about 16 Kdaltons. In embodiments, alginate structures display three block types, sections of homo M, as in MMMMMM, blocks of homo G, as in GGGGGG, and blocks of alternating G and M as in GMGMGMGM. The total number of residues (m+n) can vary from about 50 residues to about 100,000 residues. In embodiments, a number average molecular weight may be from about 1 Kdaltons to about 50 Kdaltons. In embodiments, a number average molecular weight may be from about 1 Kdaltons to about 20 Kdaltons. In embodiments, a number average molecular weight may be from about 10 Kdaltons to about 50 Kdaltons. In embodiments, where the gellant system includes alginic acid, the crosslinker can be a metal crosslinker. In embodiments, the metal crosslinker is a divalent metal ion. In embodiments, the metal crosslinker is a trivalent metal ion. Alginic acid can also be co-crosslinked with other polysaccharides, such as chitosan. The resultant chitosan-alginate hydrogels may provide better heat stability.

In embodiments, the polysaccharide-based gellant systems herein is a cellulose. In embodiments, the polysaccharide-based gellant systems herein is a precursor of a cellulose. In embodiments, the polysaccharide-based gellant systems herein is a cellulose derivative. In embodiments, the cellulose is selected from cellulose, methyl cellulose, ethyl cellulose, ethyl methyl cellulose, hydroxyethyl cellulose, hydroxypropyl cellulose, hydroxyethyl methyl cellulose, hydroxypropyl methyl cellulose, ethyl hydroxyl ethyl cellulose, carboxymethyl cellulose, carboxymethylhydroxyethyl cellulose, cellulose sulfate, cellulose acetate, and combinations thereof. In embodiments, the polysaccharide-based gellant systems herein is methyl cellulose. In embodiments, the polysaccharide-based gellant systems herein is ethyl cellulose. In embodiments, the polysaccharide-based gellant systems herein is ethyl methyl cellulose. In embodiments, the polysaccharide-based gellant systems herein is hydroxyethyl cellulose. In embodiments, the polysaccharide-based gellant systems herein is hydroxyethyl cellulose. In embodiments, the polysaccharide-based gellant systems herein is hydroxypropyl cellulose. In embodiments, the polysaccharide-based gellant systems herein is hydroxyethyl methyl cellulose. In embodiments, the polysaccharide-based gellant systems herein is hydroxypropyl methyl cellulose. In embodiments, the polysaccharide-based gellant systems herein is ethyl hydroxyl ethyl cellulose. In embodiments, the polysaccharide-based gellant systems herein is carboxymethyl cellulose. In embodiments, the polysaccharide-based gellant systems herein is carboxymethylhydroxyethyl cellulose. In embodiments, the polysaccharide-based gellant systems herein is cellulose sulfate. In embodiments, the polysaccharide-based gellant systems herein is cellulose acetate. In embodiments, the polysaccharide-based gellant systems herein is a combinations of any cellulose or derivative of cellulose disclosed herein.

Cellulose itself has the general structure of formula (IV):

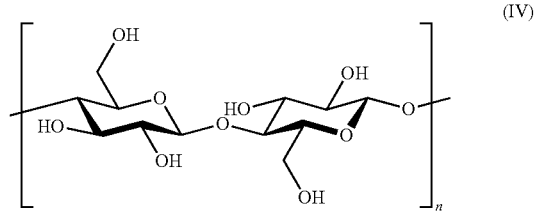

(IV)

having a linear array of beta-D-glucose units where n may vary from about 10 to about 500. In embodiments, n can vary from about 20 to about 100. In embodiments, cellulose may have a number average molecular weight from 1 Kdaltons to about 20 Kdaltons. In embodiments, cellulose may have a number average molecular weight from 2 Kdaltons to about 15 Kdaltons. In embodiments, cellulose may have a number average molecular weights range from about 5.5 Kdaltons to about 11 Kdaltons. In embodiments, gellant systems employing the parent cellulose may be formed via a cellulose precursor such as cellulose acetate. In embodiments, the acetate groups can be removed by solvolysis. In embodiments, functionalized celluloses may be used to alter the polarity of the gellant system and/or to tune the viscosity of the resultant gel. In embodiments, charged cellulose derivatives carrying organic functional acids such as carboxymethyl cellulose have tunable viscosity via pH adjustment with acids or bases. In embodiments, cellulose-based gels may be formed in the presence of water-soluble polymers as described herein further below.

In embodiments, the polysaccharide based gellant systems may employ a guar. In some such embodiments, the guar is selected from natural guar, hydroxypropylguar (HPG), sulfonated guar, sulfonated hydroxypropylguar, carboxymethyl hydroxypropyl guar (CMHPG), carboxymethylguar. In embodiments, the guar is a natural guar. In embodiments, the guar is hydroxypropylguar (HPG). In embodiments, the guar is sulfonated guar. In embodiments, the guar is sulfonated hydroxypropylguar. In embodiments, the guar is carboxymethyl hydroxypropyl guar (CMHPG). In embodiments, the guar is carboxymethyl guar. Guars have a core structure based on Formula (V):

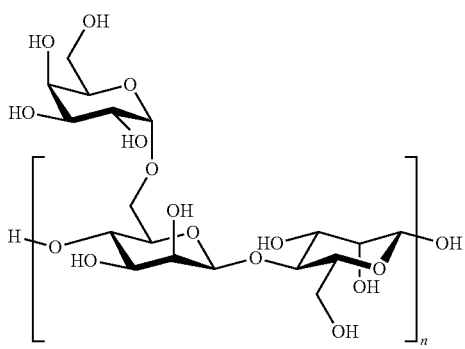

(V)

having pendant galactose unit appearing on a backbone of beta-linked mannose units where n provides molecular weights a number average molecular weight of about 100 to about 500 Kdaltons. In embodiments, n provides molecular weights a number average molecular weight of about 125 to about 300 Kdaltons. In embodiments, a weight average molecular weight may be in a range from about 500 Kdaltons to about 2,500 Kdaltons. In embodiments, a weight average molecular weight may be in a range from about 700 Kdaltons to about 1,500 Kdaltons. In embodiments, a number average molecular weight is ($M_n$) about 240 Kdaltons and a weight average molecular weight ($M_w$) of 950 Kdaltons. In embodiments, guars can be gelled in the presence of crosslinkers such as calcium ion, borates, titanates, and the like. As with other charged polysaccharides, guars bearing charged groups such as sulfonated guar, may provide an added benefit in immobilizing nicotine. Other functionalized guars may be used to tune the hydrophobicity/hydrophilicity of the gel system to accommodate nicotine or its salts.

In embodiments, the polysaccharide-based gellant system may comprise a xanthan gum. Xanthan gums are obtained from the species of bacteria used, *Xanthomonas campestris*. Xanthan gums have a basic core structure of formula (VI):

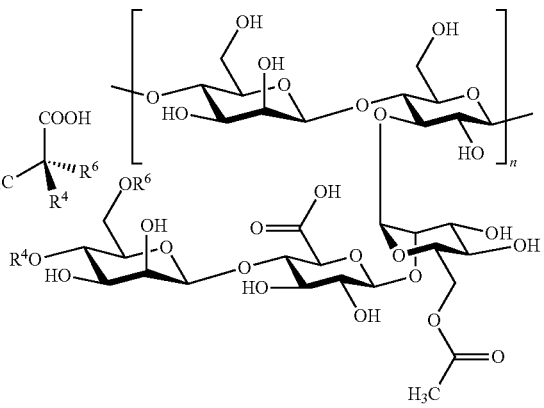

(VI)

In embodiments, modified xanthan gums can be used in forming hydrogels. In embodiments, the native form xanthan gums can be used as gel modifiers including as viscosity modifying agents as disclosed herein. The value for n in formula IV, based on a 2 Kdaltons MW of the formula (IV) monomer unit, provides a weight average molecular weight in a range from about 300 Kdaltons to about 8 megadaltons, in embodiments. In embodiments, the weight average molecular weight is in a range from about 500 Kdaltons to about 1 megadalton. In embodiments, the weight average molecular weight is in a range from about 700 Kdaltons to about 1 megadalton.

In embodiments, the polysaccharide-based gellant system may comprise an agar. Agar itself is typically a mixture of agarose of formula (VII) and agaropectin:

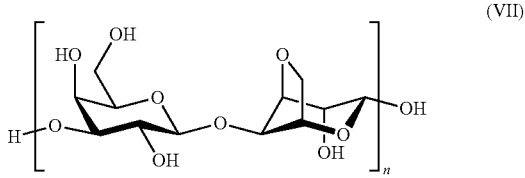

(VII)

The agarose backbone is a disaccharide made up of D-galactose and 3,6-anhydro-L-galactopyranose. In embodiments, n has a value such that a molecular weight of agarose is about 50 to about 400 Kdaltons. In embodiments, n has a value such that a molecular weight of agarose is about 75 to about 200 Kdaltons. In embodiments, n has a value such that a molecular weight of agarose is about 120 Kdaltons. Agaropectin is a heterogeneous mixture of smaller oligosaccharides which performs the function of a gel modifier as defined herein. In embodiments, agaropectin may have an ester sulfate content conferring a charge which may facilitate interaction with nicotine or its salt.

In embodiments, the polysaccharide-based gellant system may comprise a gellan. Gellan gum water-soluble anionic polysaccharide produced by the bacterium *Sphingomonas elodea* of structural formula (VIII):

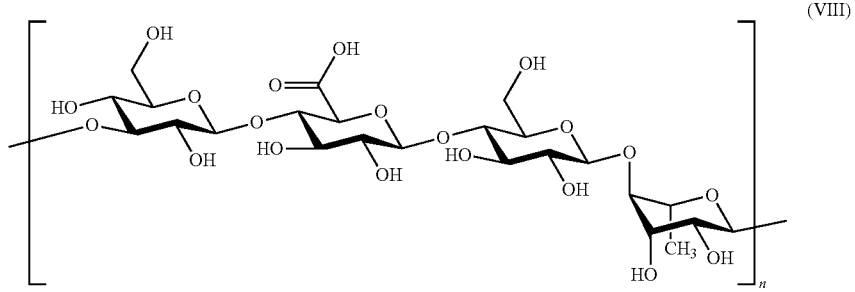

(VIII)

where n provides weight average molecular weights in a range from about 0.5 megadaltons to about 3 megadaltons. In embodiments, reduced weight gellans have molecular weights from about 0.5 megadaltons to about 1.5 megadaltons.

In embodiments, the polysaccharide-based gellant system may comprise an amylose. Amylose is comprised of alpha linked D glucose units as indicated in formula (IX) below:

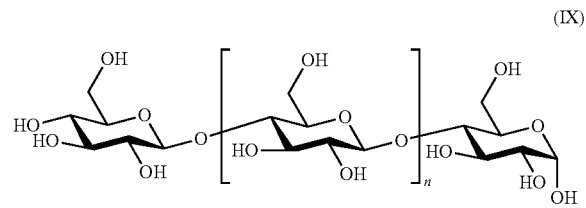

(IX)

In embodiments, n is an integer from about 100 to about 1000. In embodiments, n is an integer from about 200 to about 700. In embodiments, n is an integer from about 300 to about 600. In embodiments, amylose may be used in conjunction with starch, wherein starch provides the primary polysaccharide of the gellant system and amylose serves as the gel modifier. For example, amylose may be used to modulate gel viscosity of starch-based gellant systems. In other embodiments, amylose is the primary polysaccharide of the gellant-based system. In either role, as primary polysaccharide or gel modifier, amylose may provide an interaction with an inhalable bioactive agent. In embodiments, amylose may be combined with xanthan gum. In embodiments, amylose may be combined with alginate. In embodiments, amylose may be combined with carrageenan.

In embodiments, the polysaccharide-based gellant system may comprise a welan gum. Welan gum is produced by fermentation of sugar by bacteria of the genus *Alcaligenes*. The molecule consists of repeating tetrasaccharide units with single branches of L-mannose or L-rhamnose and is shown below as formula (X):

(X)

where n has a value such that a weight average molecular weight is in a range from about 0.25 megadaltons to about 3 megadaltons. In embodiments, n has a value such that a weight average molecular weight is in a range from about 0.5 megadaltons to about 2 megadaltons. In embodiments, n has a value such that a weight average molecular weight is about 1 megadalton.

In embodiments, the polysaccharide-based gellant system may include a rhamsan. In embodiments, rhamsan gums may be in acetylated form. In embodiments, rhamsan gums can be in deacetylated form. In embodiments, deacetylated rhamsan forms gel materials when crosslinked with divalent metal ions. In embodiments, the divalent ion is calcium ion. In embodiments, the divalent ion is magnesium. Deacetylated rhamsan gum has a structure shown in formula (XI):

(XI)

where n provides molecular weights in a range similar to that of diutan discussed herein further below.

In embodiments, the polysaccharide-based gellant system may include a carrageenan. Carrageenans polysaccharides come in three common forms naturally kappa, iota, and lambda. In embodiments, the structural variation provides access to gels with tunable properties. In embodiments, the carrageenan is kappa form. In embodiments, the carrageenan is iota form. In embodiments, the carrageenan is lambda form. Carrageenans include repeating galactose units and 3,6 anhydrogalactose and can be both sulfated and nonsulfated. The units are joined by alternating alpha-1,3 and beta-1,4 glycosidic linkages. The structures of numerous carrageenan cores are shown below. In embodiments, the carrageenan may be a lambda carrageenan. This particular form has the advantage of being readily useable in aqueous systems dissolving easily at room temperature in water. Again, sulfated forms of carrageenans may be useful in connection with nicotine with its ability to form salts.

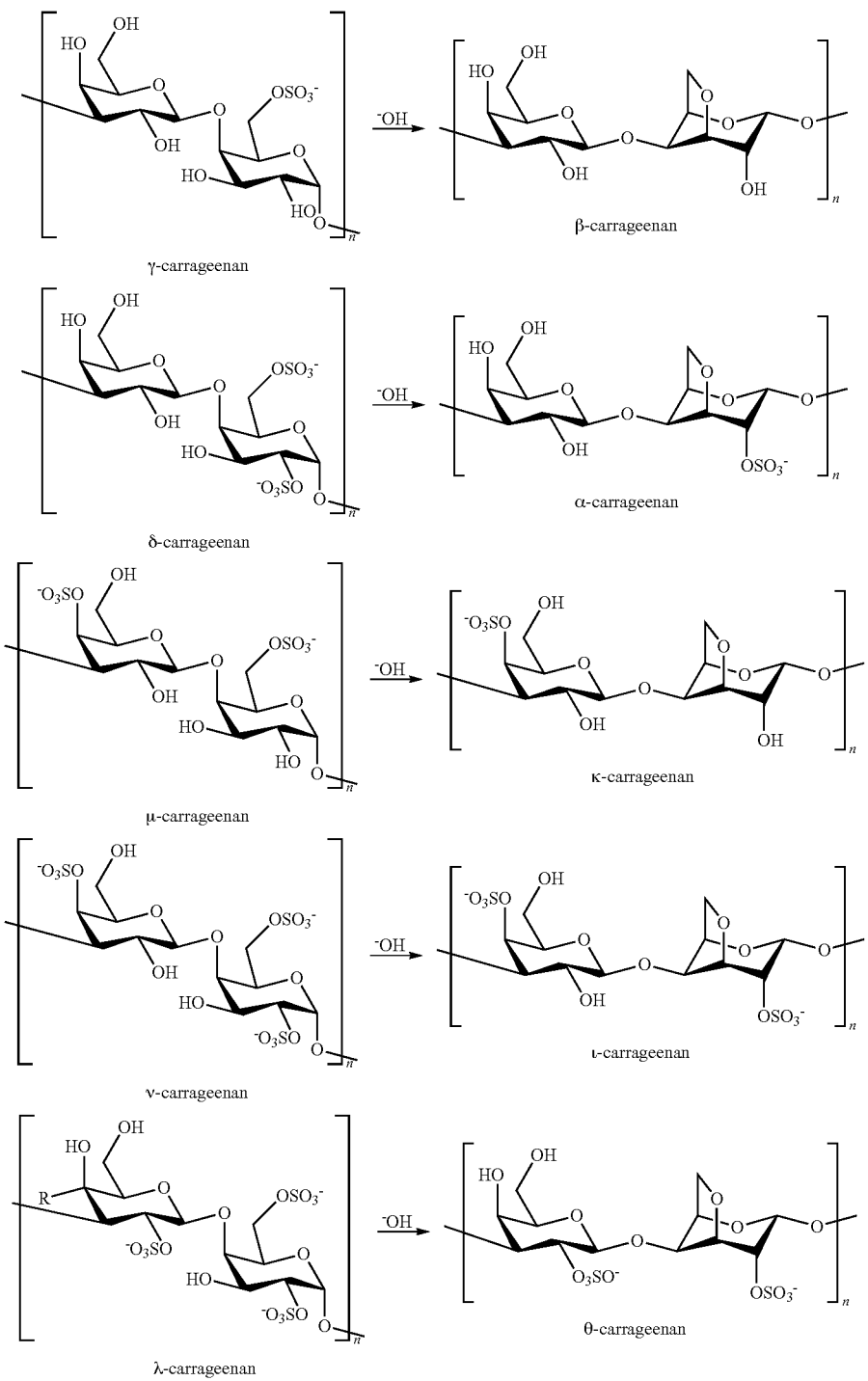

where values of n provide weight average molecular weights between about 100 Kdaltons to about 5,000 Kdaltons. In embodiments, n provides weight average molecular weights between about 300 Kdaltons to about 2,000 Kdaltons. In embodiments, n provides weight average molecular weights between about 400 Kdaltons to about 1,000 Kdaltons.

In embodiments, the polysaccharide-based gellant system may comprise a chitosan. Chitosan is a readily available material derived from the shell material of shrimp and other crustaceans. Chitosan has a structure of formula (XII):

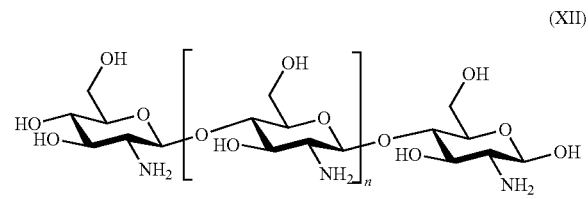

(XII)

where values of n provide weight average molecular weights between about 10 Kdaltons to about 4,000 Kdaltons. In embodiments, n provides weight average molecular weights between about 50 Kdaltons to about 2,000 Kdaltons. In embodiments, n provides weight average molecular weights between about 100 Kdaltons to about 800 Kdaltons.

In embodiments, chitosan is co-crosslinked with alginate. Again, without being bound by theory, it has been postulated that chitosan can lend thermal stability to alginate gels. In this regard, chitosan may serve as a gel modifier in embodiments.

In embodiments, the polysaccharide-based gellant system may comprise a scleroglucan. Scleroglucans have a general structure as shown in formula (XIII):

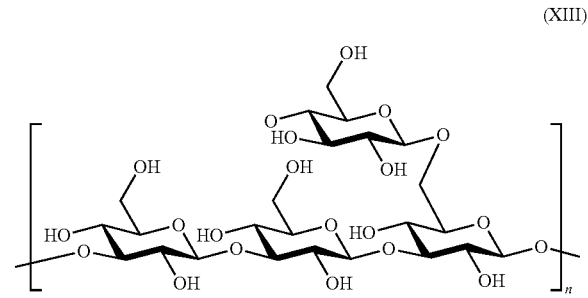

(XIII)

where values of n provide weight average molecular weights in a range from about 0.5 megadaltons to about 4 megadaltons. In embodiments, n provides weight average molecular weights from about 1 megadaltons to about 3 megadaltons. In embodiments, n provides weight average molecular weights of about 2 megadaltons.

Scleroglucans readily form gels in the presence of sodium tetraborate (borax). Hydrogels have also been formed form partially oxidized Scleroglucans, with the gel character being related to the degree of oxidation.

In embodiments, the polysaccharide-based gellant system may include a diutan gum. Diutan is a complex polysaccharide structures with a backbone made up of d-glucose, d-glucuronic acid, d-glucose, and l-rhamnose, and a side chain of two l-rhamnose residues. In embodiments, diutans have a weight average molecular weight from about 1 megadaltons to about 10 megadaltons. In embodiments, diutans have a weight average molecular weight of about 5 megadaltons. Diutans may be employed as a gel modifier in embodiments and may be particularly useful in conjunction with other polysaccharides that are susceptible to calcium ion crosslinking. Diutans themselves are not typically crosslinked by calcium ion. Diutans exhibit good thermal stability as well.

In embodiments, the polysaccharide-based gellant system may comprise a pectin. Pectins are polysaccharides rich in galacturonic acid and are found commonly in fruits. In nature, the galacturonic acids may be present with a variable degree of methylation (methyl ester). In embodiments, the pectin is a so called "low methoxy" pectin, i.e., a low degree of methyl ester, called LM-pectin. LM-pectin readily forms a gel system in the presence of calcium ion as a crosslinker.

In embodiments, the primary polysaccharide of a gellant system may be present in an amount from about 1 to about 50% w/w of the gel composition, including any value in between and fractions thereof. In embodiments, the primary polysaccharide may be present at about 1% w/w of the gel composition. In embodiments, the primary polysaccharide may be present at about 2% w/w. In embodiments, the primary polysaccharide may be present at about 3% w/w. In embodiments, the primary polysaccharide may be present at about 5% w/w. In embodiments, the primary polysaccharide may be present at about 10% w/w. In embodiments, the primary polysaccharide may be present at about 15% w/w. In embodiments, the primary polysaccharide may be present at about 20% w/w. In embodiments, the primary polysaccharide may be present at about 25% w/w. In embodiments, the primary polysaccharide may be present at about 30% w/w. In embodiments, the primary polysaccharide may be present at about 35% w/w. In embodiments, the primary polysaccharide may be present at about 40% w/w. In embodiments, the primary polysaccharide may be present at about 45% w/w. In embodiments, the primary polysaccharide may be present at about 50% w/w. In embodiments, the primary polysaccharide of a gellant system may be present in an amount from about 1% w/w/ to 10% w/w of the gel composition. In embodiments, the primary polysaccharide of a gellant system may be present in an amount from about 10% w/w to about 20% w/w of the gel composition. In embodiments, the primary polysaccharide of a gellant system may be present in an amount from about 20% w/w to about 30% w/w of the gel composition. In embodiments, the primary polysaccharide of a gellant system may be present in an amount from about 30% w/w to about 40% of the gel composition. In embodiments, the primary polysaccharide of a gellant system may be present in an amount from about 40% w/w to about 50% w/w of the gel composition.

In embodiments, the gellant systems comprise a gel modifier. In some such embodiments, the gel modifier comprises a crosslinker. Polyhydric systems (containing many hydroxyl groups) such as polysaccharides are frequently susceptible to crosslinking in the presence of metal ions. In some such embodiments, the crosslinker may comprise a divalent or trivalent metal cation. Among divalent metal cations, the crosslinker may comprise any of the alkaline earth metal ions. Exemplary crosslinkers may comprise a borate, a titanate, calcium ion, aluminum ion, copper ion, zinc ion, zirconium ion, magnesium ion, oxides of any of the foregoing metals and combinations thereof.

Other crosslinkers or viscosity managing gel modifiers in polysaccharide-based gellant systems include surfactants. When present, the surfactant may include one or more of an anionic surfactant, a cationic surfactant, a zwitterionic and/ or non-ionic surfactant, and combinations thereof. In embodiments, the polysaccharide-based gellant includes an anionic surfactant. In embodiments, the polysaccharide-based gellant includes a cationic surfactant. In embodiments, the polysaccharide-based gellant includes zwitterionic surfactant. In embodiments, the polysaccharide-based gellant includes non-ionic surfactant.

In embodiments, anionic surfactants which may be utilized include sulfates and/or sulfonates. In embodiments, the anionic surfactant is sodium dodecylsulfate (SDS). In embodiments, the anionic surfactant is sodium dodecylbenzene sulfonate. In embodiments, the anionic surfactant is sodium dodecylnaphthalene sulfate. In embodiments, the anionic surfactant is dialkyl benzenealkyl sulfates and/or sulfonates. In embodiments, the anionic surfactant is an acid. In embodiments, the acid is abitic acid (Aldrich). In embodiments, the acid is NEOGEN® (Daiichi Kogyo Seiyaku). In embodiments, the anionic surfactant is DOWFAX™ 2A1, an alkyldiphenyloxide disulfonate (The Dow Chemical Company). In embodiments, the anionic surfactant is TAYCA POWDER BN2060 from (Tayca Corporation), which are branched sodium dodecylbenzene sulfonates.

In embodiments, the cationic surfactant is alkylbenzyl dimethyl ammonium chloride. In embodiments, the cationic surfactant is dialkyl benzenealkyl ammonium chloride. In embodiments, the cationic surfactant is lauryl trimethyl ammonium chloride. In embodiments, the cationic surfactant is alkylbenzyl methyl ammonium chloride. In embodiments, the cationic surfactant is alkyl benzyl dimethyl ammonium bromide. In embodiments, the cationic surfactant is benzalkonium chloride. In embodiments, the cationic surfactant is cetyl pyridinium bromide. In embodiments, the cationic surfactant is a $C_{12}$, $C_{15}$, and/or $C_{17}$ trimethyl ammonium bromide. In embodiments, the cationic surfactant is a halide salt of quaternized polyoxyethylalkylamines. In embodiments, the cationic surfactant is dodecylbenzyl triethyl ammonium chloride. In embodiments, the cationic surfactant is MIRAPOL™. In embodiments, the cationic surfactant is ALKAQUAT™ (Alkaril Chemical Company). In embodiments, the cationic surfactant is SANIZOL™ (benzalkonium chloride, Kao Chemicals).

In embodiments, the zwitterionic surfactant is a betaine.

In embodiments, the non-ionic surfactants is polyacrylic acid. In embodiments, the non-ionic surfactants is methalose. In embodiments, the non-ionic surfactants is methyl cellulose. In embodiments, the non-ionic surfactants is ethyl cellulose. In embodiments, the non-ionic surfactants is propyl cellulose. In embodiments, the non-ionic surfactants is hydroxy ethyl cellulose. In embodiments, the non-ionic surfactants is carboxy methyl cellulose. In embodiments, the non-ionic surfactants is polyoxyethylene cetyl ether. In embodiments, the non-ionic surfactants is polyoxyethylene lauryl ether. In embodiments, the non-ionic surfactants is polyoxyethylene octyl ether. In embodiments, the non-ionic surfactants is polyoxyethylene octylphenyl ether. In embodiments, the non-ionic surfactants is polyoxyethylene oleyl ether. In embodiments, the non-ionic surfactants is polyoxyethylene sorbitan monolaurate. In embodiments, the non-ionic surfactants is polyoxyethylene stearyl ether. In embodiments, the non-ionic surfactants is polyoxyethylene nonylphenyl ether. In embodiments, the non-ionic surfactants is dialkylphenoxy poly(ethyleneoxy) ethanol. Note, that among these non-ionic surfactants that act as gel modifiers include examples of functionalized celluloses. Their use as a gel modifier for their surfactant character is intended to be in conjunction with a primary polysaccharide for the purpose of forming the gellant systems disclosed herein which have at least two components, a primary polysaccharide and a gel modifier.

In embodiments, the gel modifier includes a water-soluble polymer. In embodiments, the water-soluble polymer displays surfactant character. In embodiments, the water-soluble polymer is selected from a polyether, a polyvinylpyrrolidone, a polyvinyl alcohol, a polyacrylic acid, a polyacrylamide, a polyoxazoline, a polyphosphate, and an albumin. Exemplary water-soluble polymers include polyethylene glycols (PEGs), polaxamers such as PLURONIC™ F-127 (BASF), and water-soluble polysaccharides or their derivatives in classes such as xanthan gums, pectins, chitosans, dextrans, carrageenans, guar gums, and the like. In embodiments, the gel modifier is a polyether. In embodiments, the gel modifier is a polyvinylpyrrolidone. In embodiments, the gel modifier is a polyvinyl alcohol. In embodiments, the gel modifier is a polyacrylic acid. In embodiments, the gel modifier is a polyacrylamide. In embodiments, the gel modifier is a polyoxazoline. In embodiments, the gel modifier is a polyphosphate. In embodiments, the gel modifier is an albumin. In embodiments, the water-soluble polymer is a polyethylene glycol (PEG). In embodiments, the water-soluble polymer is a poloxamer. In embodiments, the poloxamer is PLURONIC™ F-127 (BASF). In embodiments, the water-soluble polymer is a polysaccharide. In embodiments, the water-soluble polymer is a xanthan gum. In embodiments, the water-soluble polymer is a pectin. In embodiments, the water-soluble polymer is a chitosan. In embodiments, the water-soluble polymer is a dextran. In embodiments, the water-soluble polymer is a carrageenan. In embodiments, the water-soluble polymer is a guar gum.

In embodiments, the water-soluble polymer is present in an amount from about 1 to about 50% w/w of the gel composition, including any sub-range in between and fractions thereof. In embodiments, the water-soluble polymer may be present at about 1% w/w of the gel composition. In embodiments, the water-soluble polymer may be present at about 2% w/w of the gel composition. In embodiments, the water-soluble polymer may be present at about 3% w/w of the gel composition. In embodiments, the water-soluble polymer may be present at about 5% w/w of the gel composition. In embodiments, the water-soluble polymer may be present at about 10% w/w of the gel composition. In embodiments, the water-soluble polymer may be present at about 15% w/w of the gel composition. In embodiments, the water-soluble polymer may be present at about 20% w/w of the gel composition. In embodiments, the water-soluble polymer may be present at about 25% w/w of the gel composition. In embodiments, the water-soluble polymer may be present at about 30% w/w of the gel composition. In embodiments, the water-soluble polymer may be present at about 35% w/w of the gel composition. In embodiments, the water-soluble polymer may be present at about 40% w/w of the gel composition. In embodiments, the water-soluble polymer may be present at about 45% w/w of the gel composition. In embodiments, the water-soluble polymer may be present at about 50% w/w of the gel composition. In embodiments, the water-soluble polymer of a gellant system may be present in an amount from about 1 to about 50% w/w of the gel composition, including any sub-range in between and fractions thereof. In embodiments, the water-soluble polymer of a gellant system may be present in an amount from about 1% w/w/ to 10% w/w of the gel composition. In embodiments, the water-soluble polymer of a gellant system may be present in an amount from about 10% w/w to about 20% w/w of the gel composition. In embodiments, the water-soluble polymer of a gellant system may be present in an amount from about 20% w/w to about 30% w/w of the gel composition. In embodiments, the water-soluble polymer of a gellant system may be present in an amount from about 30% w/w to about 40% of the gel composition. In embodiments, the water-soluble polymer of a gellant system may be present in an amount from about 40% w/w to about 50% w/w of the gel composition.

In embodiments, a gel wick 260 may include a cellulose matrix and a water-soluble polymer. The use of cellulose in an aqueous gellant system can be challenging due to its poor water solubility. Therefore, the cellulose matrix may be generated from a cellulose precursor or oligomers with low molecular weight. For example, a solution of cellulose acetate in an organic solvent may provide the precursor to cellulose. Cellulose may later be formed by acetate removal, which may be carried out solvolytically. Separately, a water-soluble polymer may be added into water. The organic cellulosic solution may then be introduced into the aqueous polymer solution to induce gelation. The organic solvents may be removed by dialyzing or other means, such as evaporation under reduced pressure. The resulting material is a hydrogel of cellulose In embodiments, gel wick 260 can be made by a process that employs cellulose precursor which may be cellulose acetate, or any other organic soluble derivative that can be converted to cellulose. Such derivatives include conventional organic synthetic protecting groups for the hydroxyl group that confer solubility to cellulose. See Greene and Wuts, *Protecting Groups in Organic Chemistry*, $2^{nd}$ ed. John Wiley & Sons, NY (1991). In other embodiments, the cellulose precursor may be commercially available derivatives such as ethyl cellulose.

Although embodiments described above employ a cellulose matrix (or precursor to generate a cellulose matrix), in other embodiments the cellulose may be a derivative selected from the group consisting of methyl cellulose, ethyl cellulose, ethyl methyl cellulose, hydroxyethyl cellulose, hydroxypropyl cellulose, hydroxyethyl methyl cellulose, hydroxypropyl methyl cellulose, ethyl hydroxyl ethyl cellulose, carboxymethyl cellulose, carboxymethylhydroxyethyl cellulose, cellulose sulfate, and combinations thereof. In embodiments, the cellulose is a derivative of methyl cellulose. In embodiments, the cellulose is a derivative of ethyl cellulose. In embodiments, the cellulose is a derivative of ethyl methyl cellulose. In embodiments, the cellulose is a derivative of hydroxyethyl cellulose. In embodiments, the cellulose is a derivative of hydroxyethyl methyl cellulose. In embodiments, the cellulose is a derivative of hydroxypropyl methyl cellulose. In embodiments, the cellulose is a derivative of ethyl hydroxyl ethyl cellulose. In embodiments, the cellulose is a derivative of carboxymethyl cellulose. In embodiments, the cellulose is a derivative of carboxymethylhydroxyethyl cellulose. In embodiments, the cellulose is a derivative of cellulose sulfate.

In one or more of the preceding embodiments, the cellulose based gellant system may employ any water-soluble polymer. In embodiments, the water-soluble polymer is a polyether. In embodiments, the water-soluble polymer is selected from the group consisting of polyethylene glycol (PEG), a block copolymer of PEG and polypropylene glycol (PPG), and combinations thereof. In embodiments, the water-soluble polymer comprises a polyvinylpyrrolidone. In embodiments, the water-soluble polymer is polyethylene glycol (PEG). In embodiments, the water-soluble polymer is polypropylene glycol (PPG).

The water-soluble polymer may have a number average molecular weight ($M_n$) from about 5,000 daltons to about 30,000 daltons. In other embodiments, the water-soluble polymer has a number average molecular weight (Mn) from about 10,000 daltons to about 20,000 daltons.

In embodiments, a ratio of the cellulose matrix to the water-soluble polymer is in a range from about 10:1 to about 1.5:1, and in embodiments. In embodiments, a ratio of the cellulose matrix to the water-soluble polymer is in a range from about 5:1 to about 2:1. The cellulose matrix itself may be used in an amount from about 1 to about 10% w/w of the composition. In embodiments, cellulose is present at about 1%. In embodiments, cellulose is present at about 2%. In embodiments, cellulose is present at about 3%. In embodiments, cellulose is present at about 4%. In embodiments, cellulose is present at about 5%. In embodiments, cellulose is present at about 6%. In embodiments, cellulose is present at about 7%. In embodiments, cellulose is present at about 8%. In embodiments, cellulose is present at about 9%. In embodiments, cellulose is present at about 10% w/w of the composition. In embodiments, a ratio of the cellulose matrix to the water-soluble polymer is in a range from about 10:1 to about 1.5:1, and in embodiments including any fractional value thereof.

In embodiments, is a gel wick 260 may include an alginate and an alginate crosslinker. As described above, alginate may be provided as a salt form prior to crosslinking. In embodiments, the alginate crosslinker comprises a divalent cation. In embodiments, the divalent cation is an alkaline earth metal ion. In other embodiments, the divalent cation is a transition metal of oxidation state (II), such as zinc or iron. In embodiments, the alginate crosslinker comprises calcium ion. In embodiments, the crosslinker comprises chitosan.

In embodiments, a process for preparing a gel wick 260 may include dissolving a crosslinker in water to form a first solution, dissolving an alginate in water to form a second solution, adding a drop of the second solution to the first solution to form the gel.

In embodiments, a gel wick 260 may include a sol-gel matrix. In embodiments, the sol-gel matrix comprises a metal oxide. In embodiments, compositions disclosed herein may be characterized by physical properties including, without limitation, swellability, density, porosity and the like. Those skilled in the art will recognize that the exact gel properties may depend on materials used to make the sol gel polymer including, without limitation, the selection of metal or metals, and any ligands that are present on the metal oxide precursor.

In embodiments, the sol-gel matrix has a density of about 0.5 g/cm$^3$ to about 1.5 g/cm$^3$, including any sub-range in between and fractions thereof. In embodiments, the sol-gel matrix has a density of about 0.5 g/cm$^3$ to about 1.3 g/cm$^3$. In embodiments, the sol-gel matrix has a density of about 0.7 g/cm$^3$ to about 1.3 g/cm$^3$. In embodiments, the sol-gel matrix has a density of about 0.7 g/cm$^3$ to about 1.1 g/cm$^3$.

In embodiments, the sol-gel matrix is derived from a silicon-containing precursor. In embodiments, the silicon-containing precursor is selected from the group consisting of a silicon alkoxide, a silicon halide, and/or a mixed silicon alkoxide halide, including combinations thereof. In embodiments, the silicon containing precursor is a tetraalkoxysilane. In embodiments, the silicon tetralkoxide is selected from the group consisting of tetramethoxysilane, tetraethoxysilane, and tetrapropoxysilane. In embodiments, the silicon halide is tetrachlorosilane. In embodiments, the silicon containing precursor may be a silane having the general formula (XIV): $(RO)_mSiX_n$, where m and n are integers each independently selected from 0 to 4, where the total of m plus n is 4, R is a substituted or unsubstituted alkyl group and X is a halogen. In embodiments, R is an unsubstituted alkyl group. In embodiments, where R is substituted, R is substituted with a substituent group, as defined below.

The term "alkyl," refers to a straight-chain or branched-chain alkyl radical (e.g., containing from 1 to 20 carbon atoms). In embodiments, the alkyl may comprise from 1 to 10 carbon atoms. In embodiments, the alkyl may comprise from 1 to 6 carbon atoms, or in embodiments, from 1 to 4 carbon atoms. In embodiments, the alkyl group may contain from 1 to 2 carbon atoms. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, and so on. In embodiments, R is methyl, ethyl, propyl, isopropyl, butyl, isobutyl, sec-butyl, tert-butyl, pentyl, isopentyl or hexyl. In embodiments, R is methyl. In embodiments, R is ethyl.

A "substituent group," as used herein, means a group selected from the following moieties: (A) oxo, halogen, $-CCl_3$, $-CBr_3$, $-CF_3$, $-CI_3$, $-CH_2Cl$, $-CH_2Br$, $-CH_2F$, $-CH_2I$, $-CHCl_2$, $-CHBr_2$, $-CHF_2$, $-CHI_2$, $-CN$, $-OH$, $-NH_2$, $-COOH$, $-CONH_2$, $-NO_2$, $-SH$, $-SO_3H$, $-SO_4H$, $-SO_2NH_2$, $-NHNH_2$, $-ONH_2$, $-NHC(O)NHNH_2$, $-NHC(O)NH_2$, $-NHSO_2H$, $-NHC(O)H$, $-NHC(O)OH$, $-NHOH$, $-OCCl_3$, $-OCF_3$, $-OCBr_3$, $-OCI_3$, $-OCHCl_2$, $-OCHBr_2$, $-OCHI_2$, $-OCHF_2$, $-PO_3H$, $-PO_4H$, $-N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl).

In embodiments, each R is, independently, a substituted or unsubstituted $C_1$-$C_{20}$ alkyl. In embodiments, each R is, independently, a substituted or unsubstituted $C_1$-$C_8$ alkyl. In embodiments, each R is, independently, a substituted or unsubstituted $C_1$-$C_4$ alkyl. In embodiments, each R is, independently, a $C_1$-$C_2$ alkyl.

In embodiments, R is a hydroxy-substituted $C_1$-$C_4$ alkyl group.

In embodiments, n is 1. In embodiments, n is 2. In embodiments, n is 3. In embodiments, n is 4. In embodiments, m is 1. In embodiments m is 2. In embodiments, m is 3. In embodiments, m is 4. In embodiments, m is 4 and n is 0. In embodiments, m is 0 and n is 4. In embodiments, m is 3 and n is 1. In embodiments, m is 1 and n is 3. In embodiments, m is 2 and n is 2.

The term "halogen," as used herein, refers to fluorine, chlorine, bromine, or iodine. In embodiments, X is chlorine.

In embodiments, the sol-gel matrix is derived from a titanium-containing precursor. In embodiments, the titanium-containing precursor is selected from the group consisting of titanium tetraethoxide, titanium tetraisopropoxide, titanium tetrabutoxide, titanium oxide sulfate hydrate, and titanium tetrachloride. In embodiments, the titanium containing precursor may have the general formula (XV): $(RO)_mTiX_n$, where m and n are integers each independently selected from 0 to 4, where the total of m plus n is 4, R is an alkyl group and X is a halogen. In embodiments, n is 1. In embodiments, n is 2. In embodiments, n is 3. In embodiments, n is 4. In embodiments, m is 1. In embodiments m is 2. In embodiments, m is 3. In embodiments, m is 4. In embodiments, m is 4 and n is 0. In embodiments, m is 0 and n is 4. In embodiments, m is 3 and n is 1. In embodiments, m is 1 and n is 3. In embodiments, m is 2 and n is 2. Alkyl and halogen are defined as above.

In embodiments, the sol-gel matrix is derived from a zirconium-containing precursor. In embodiments, the zirconium-containing precursor is zirconium tetrapropoxide. In embodiments, the zirconium containing precursor may have the general formula (XVI): $(RO)_mZrX_n$, where m and n are integers each independently selected from 0 to 4, where the total of m plus n is 4, R is an alkyl group and X is a halogen. In embodiments, n is 1. In embodiments, n is 2. In embodiments, n is 3. In embodiments, n is 4. In embodiments, m is 1. In embodiments, m is 2. In embodiments, m is 3. In embodiments, m is 4. In embodiments, m is 4 and n is 0. In embodiments, m is 0 and n is 4. In embodiments, m is 3 and n is 1. In embodiments, m is 1 and n is 3. In embodiments, m is 2 and n is 2. Alkyl and halogen are defined as above.

In embodiments, the sol-gel matrix is derived from an aluminum-containing precursor. In embodiments, the aluminum-containing precursor comprises an aluminum oxide or aluminum alkoxide. In embodiments, the aluminum containing precursor may have the general formula (XVII): $(RO)_mAlX_n$, where m and n are integers each independently selected from 0 to 4, where the total of m plus n is 3 or 4 (i.e., aluminate), R is an alkyl group and X is a halogen. In embodiments, m is 4 and n is 0. In embodiments, n is 1. In embodiments, n is 2. In embodiments, n is 3. In embodiments, n is 4. In embodiments, m is 1. In embodiments, m is 2. In embodiments, m is 3. In embodiments, m is 4. In embodiments, m is 0 and n is 4. In embodiments, m is 3 and n is 1. In embodiments, m is 1 and n is 3. In embodiments, m is 2 and n is 2. Alkyl and halogen are defined as above.

In embodiments, the sol-gel matrix is derived from two or more precursors selected from a silicon-containing precursor, a titanium-containing precursor, a zirconium-containing precursor, and an aluminum-containing precursor. In embodiments, the sol-gel matrix is prepared by combination of two metal precursors that include a mixture of compounds of formulas XIV and XV. In embodiments, the sol-gel matrix is prepared by combination of two metal precursors that include a mixture of compounds of formulas XIV and XVI. In embodiments, the sol-gel matrix is prepared by combination of two metal precursors that include a mixture of compounds of formulas XIV and XVII. In embodiments, the sol-gel matrix is prepared by combination of two metal precursors that include a mixture of compounds of formulas XV and XVI. In embodiments, the sol-gel matrix is prepared by combination of two metal precursors that include a mixture of compounds of formulas XV and XVII. In embodiments, the sol-gel matrix is prepared by combination of two metal precursors that include a mixture of compounds of formulas XVI and XVII, each as defined above. In embodiments, the sol-gel matrix is prepared by a combination of three metal precursors that include compounds of formulas XIV, XV, and XVI. In embodiments, the sol-gel matrix is prepared by a combination of three metal precursors that include compounds of formulas XIV, XV and XVII. In embodiments, the sol-gel matrix is prepared by a combination of three metal precursors that include compounds of formulas XIV, XVI and XVII. In embodiments, the sol-gel matrix is prepared by a combination of three metal precursors that include compounds of formulas XV, XVI, and XVII, each as defined above. In embodiments, the sol-gel matrix is prepared by a combination of four metal precursors that include compounds of formulas XIV, XV, XVI, and XVII. In embodiments, the sol-gel matrix is prepared by a combination of two different compounds of formula L. In embodiments, the sol-gel matrix is prepared by a combination of two different compounds of formula XIV. In embodiments, the sol-gel matrix is prepared by a combination of two different compounds of formula XV. In embodiments, the sol-gel matrix is prepared by a combination of two different compounds of formula XVI. In embodiments, the sol-gel matrix is prepared by a combination of two different compounds of formula XVII, each as defined above. In embodiments, any combination of any number of variations of compounds of formulas XIV, XV, XVI, and XVII may be used to prepare a sol-gel matrix for the compositions disclosed herein. The selection of particular metals and ligand combinations is guided by a desired target set of properties. As explained herein, for example, longer R alkyl groups may provide a sterically crowded environment resulting in a more porous, less dense structure. In addition to swellability, density, and porosity, another property of interest may be gel hardness and/or viscosity.

In embodiments, the sol-gel matrix is a composite material with an organic polymeric additive. In embodiments, the organic polymeric additive is selected from the group consisting of a chitosan, a polyacrylic acid, polyvinylidene fluoride, a polyacrylic acid salt, a polyvinyl alcohol, a 2-(diethylamino)ethyl methacrylate, and a poly(methacrylic acid) salt. In embodiments, the organic polymeric additive is a chitosan. In embodiments, the organic polymeric additive is a polyacrylic acid. In embodiments, the organic polymeric additive is polyvinylidene fluoride. In embodiments, the organic polymeric additive is a polyacrylic acid salt. In embodiments, the organic polymeric additive is a polyvinyl alcohol. In embodiments, the organic polymeric additive is a 2-(diethylamino)ethyl methacrylate. In embodiments, the organic polymeric additive is a poly(methacrylic acid) salt. Where present, the amount of the organic polymeric additive may be in a range from about 4% to about 6% by volume of the composition. In embodiments, the amount of organic polymeric additive may be less than 4%, such as a non-zero amount up to about 4%, including fractions thereof. In embodiments, the amount of organic polymeric additive is about 0.5%. In embodiments, the amount of organic polymeric additive is about 1%. In embodiments, the amount of organic polymeric additive is about 2%. In embodiments, the amount of organic polymeric additive is about 3%. In embodiments, the amount of organic polymeric additive is about 4%. In embodiments, the amount of organic polymeric additive may be more than 6%, such as from about 6% up to about 10%, including fractions thereof. In embodiments, the amount of organic polymeric additive may be more than 7%, such as from about 7% up to about 10%, including fractions thereof. In embodiments, the amount of organic polymeric additive may be more than 8%, such as from about 8% up to about 10%, including fractions thereof. In embodiments, the amount of organic polymeric additive may be more than 9%, such as from about 9% up to about 10%, including fractions thereof.

In embodiments, vaporizable material 102 can be contained within the vaporizer cartridge 120 (for example, within the reservoir 140), including solutions of nicotine or other organic materials. In embodiments, aqueous-based superabsorbent polymers allow for water as the sole carrier for nicotine solution. In embodiments, aqueous-based polysaccharide system allows for water as the sole carrier for nicotine solution. In embodiments, aqueous-based cellulose gallant system allows for water as the sole carrier for nicotine solution. In embodiments, aqueous-based sol-gel matrix allows for water as the sole carrier for nicotine solution. In embodiments, the vaporizable material 102 comprises aqueous solution of nicotine.

In embodiments, vaporizable material 102 may further comprise a humectant. In embodiments, the humectant comprises glycerin. In embodiments, the humectant comprises propylene glycol, glycerin, or combinations thereof. In still further embodiments, the humectant is free of one or more of propylene glycol and glycerin, though an alternative humectant is present. In embodiments, the humectant is water. In embodiments, the humectant comprises water. In embodiments, the humectant comprises 1,3-propanediol. In embodiments, the humectant may comprise a medium chain triglyceride (MCT) oil. In embodiments, the humectant may comprise PEG 400. In embodiments, the humectant may comprise PEG 4000. In embodiments, the humectant is free of both propylene glycol and vegetable glycerin. In one or more of the preceding embodiments, the glycerin may be vegetable glycerin.

In embodiments, the vaporizable material 102 may include an organic acid. In embodiments, the organic acid may serve the function of protonating nicotine to deliver nicotine in a protonated form (i.e., a salt form). In embodiments, the vaporizable material 102 includes an organic acid selected from the group consisting of benzoic acid, pyruvic acid, salicylic acid, levulinic acid, succinic acid, citric acid, malic acid, formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, phenylacetic acid, tartaric acid, lactic acid, malonic acid, fumaric acid, finnaric acid, gluconic acid, saccharic acid, sorbic acid, ascorbic acid and malonic acid, and combinations thereof. In embodiments, the vaporizable material 102 includes benzoic acid. In embodiments, the vaporizable material 102 includes pyruvic acid. In embodiments, the vaporizable material 102 includes salicylic acid. In embodiments, the vaporizable material 102 includes levulinic acid. In embodiments, the vaporizable material 102 includes succinic acid. In embodiments, the vaporizable material 102 includes citric acid. In embodiments, the vaporizable material 102 includes malic acid. In embodiments, the vaporizable material 102 includes formic acid. In embodiments, the vaporizable material 102 includes acetic acid. In embodiments, the vaporizable material 102 includes propionic acid. In embodiments, the vaporizable material 102 includes butyric acid. In embodiments, the vaporizable material 102 includes valeric acid. In embodiments, the vaporizable material 102 includes caproic acid. In embodiments, the vaporizable material 102 includes caprylic acid. In embodiments, the vaporizable material 102 includes capric acid. In embodiments, the vaporizable material 102 includes lauric acid. In embodiments, the vaporizable material 102 includes myristic acid. In embodiments, the vaporizable material 102 includes palmitic acid. In embodiments, the vaporizable material 102 includes stearic acid. In embodiments, the vaporizable material 102 includes oleic acid. In embodiments, the vaporizable material 102 includes linoleic acid. In embodiments, the vaporizable material 102 includes linolenic acid. In embodiments, the vaporizable material 102 includes phenylacetic acid. In embodiments, the vaporizable material 102 includes tartaric acid. In embodiments, the vaporizable material 102 includes lactic acid In embodiments, the vaporizable material 102 includes malonic acid. In embodiments, the vaporizable material 102 includes fumaric acid. In embodiments, the vaporizable material 102 includes finnaric acid. In embodiments, the vaporizable material 102 includes gluconic acid. In embodiments, the vaporizable material 102 includes saccharic acid. In embodiments, the vaporizable material 102 includes sorbic acid. In embodiments, the vaporizable material 102 includes ascorbic acid. In embodiments, the vaporizable material 102 includes malonic acid.

In embodiments, the vaporizable material 102 may further include a flavorant (including the aforementioned organic acids). In embodiments, the vaporizable material 102 includes a flavorant selected from the group consisting of natural extracts, such as menthol, mint, classic Virginia tobacco, cinnamon, clove, ginger, pepper, or other synthetic flavors based on esters and aldehydes, and combinations thereof. In embodiments, the flavorant may include nicotine salts, such as nicotine acetate, nicotine oxalate, nicotine malate, nicotine isovalerate, nicotine lactate, nicotine citrate, nicotine phenylacetate, and nicotine myristate. In embodiments, the flavorant is menthol. In embodiments, the flavorant is mint. In embodiments, the flavorant is classic Virginia tobacco. In embodiments, the flavorant is cinnamon. In embodiments, the flavorant is clove. In embodiments, the flavorant is ginger. In embodiments, the flavorant is pepper. In embodiments, the flavorant is an esters. In embodiments, the flavorant is an aldehyde. In embodiments, the flavorant is a nicotine salts. In embodiments, the flavorant is nicotine acetate. In embodiments, the flavorant is nicotine oxalate. In embodiments, the flavorant is nicotine malate. In embodiments, the flavorant is nicotine isovalerate. In embodiments, the flavorant is nicotine lactate. In embodiments, the flavorant is nicotine citrate. In embodiments, the flavorant is nicotine phenylacetate. In embodiments, the flavorant is nicotine myristate.

In embodiments, the vaporizable material 102 comprises an aqueous nicotine solution. In embodiments, the nicotine solution comprises a humectant, which may be an organic co-solvent, including propylene glycol, vegetable glycerin or mixtures thereof. In embodiments, the nicotine solution may comprise organic acids and/or flavorants as described above.

Terminology

When a feature or element is herein referred to as being "on" another feature or element, it can be directly on the other feature or element or intervening features and/or elements can also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements can be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature can have portions that overlap or underlie the adjacent feature.

Terminology used herein is for the purpose of describing particular embodiments and implementations only and is not intended to be limiting. For example, as used herein, the singular forms "a," "an," and "the" are intended to include the plural forms as well, unless the context clearly indicates otherwise. Thus, for example, reference to "a polysaccharide" includes a plurality of such polysaccharides and reference to "the crosslinker" includes reference to one or more crosslinkers known to those skilled in the art, and so forth.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device can be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers can be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value can have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes can be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Use of the term "based on," herein and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described herein can be directed to various combinations and subcombinations of the disclosed features and/or combinations and subcombinations of several further features disclosed herein. In addition, the logic flows depicted in the accompanying figures and/or described herein do not necessarily require the particular order shown, or sequential order, to achieve desirable results. Other implementations may be within the scope of the following claims.

As used herein, "superabsorbent polymer" or "SAP" refers to any class of petroleum-based or natural polymers that are capable of absorbing and retaining large amounts of liquid relative to its own mass, while taking on a gel form rather than becoming a substantially liquid phase solution. In embodiments, SAPs herein may absorb at least 10 times their own dried weight in fluid, or at least 20 times their own weight in fluid. Where the superabsorbent polymer has a high capacity intake for water it is often referred to as a hydrogel. Factors that impact the amount of solution intake include degree of crosslinking of the polymer, the ionic strength of the liquid, and the presence or absence of charge in the polymer network. SAPs are frequently based on the acrylic acid monomer unit and its derivatives and various graft copolymers with polysaccharides, such as polysaccharide-polyacrylonitrile (PAN) graft copolymers.

As used herein, "gel" is used in accordance with its ordinary meaning. The IUPAC provides guidance: a gel is a non-fluid colloidal network or polymer network that is expanded through its whole volume by a fluid. IUPAC. Compendium of Chemical Terminology, 2nd ed. (the "Gold Book"). Compiled by A. D. McNaught and A. Wilkinson. Blackwell Scientific Publications, Oxford (1997). Some gels disclosed herein are classified as superabsorbent polymer materials, which includes acrylate-based polymers and typically are formed via crosslinking and/or physical aggregation of polymer chains. Some gels disclosed herein are polysaccharide based and typically are formed via crosslinking and/or physical aggregation of polymer chains. A gel network is typically characterized as having regions of local order. In aqueous media, the gel is typically referred to as a "hydrogel." This contrasts with gels in organic solvent systems "organogels" or where solvent is substantially removed, "xerogels."

As used herein, "gel wick" refers to a structure that is made from a gel that is capable of transporting a liquid from one location to another location. In embodiments, a gel wick transports a vaporizable material from a reservoir to a heating element As used herein, "polysaccharide-based gellant system" refers to a chemical gel system having at least two components. The first component is a polysaccharide compound (e.g. structure) capable of forming a gel either on its own or with the aid of a secondary additive, also referred to herein as a "secondary component" or "gel modifier," as defined below. This second component may facilitate gel formation and/or modify the physical properties of a polysaccharide gel including such properties as viscosity, polymer swelling, crosslinking, macromolecular assembly, and the like. Exemplary systems include a polysaccharide and a crosslinker or a polysaccharide and a secondary hydrophilic polymer.

As used herein, "gel modifier" is a compound that modulates the supramolecular architecture (e.g. crosslinking) of the polysaccharide that forms the basis of the gel structure. While some polysaccharides described herein may be capable of performing the role of a primary polysaccharide of a gellant system and the role of a gel modifier, the gellant systems herein are two component systems such that the polysaccharide and the gel modifier are not the same molecule. Thus, a polysaccharide that gels in water with no further additives is a gellant system but does not contain a gel modifier. Gel modifiers may be integral to actual gel formation such that no gel forms with particular polysaccharides in the absence of the gel modifier. In embodiments, gel modifiers provide a crosslinking function. In embodiments, gel modifiers may operate on existing polysaccharide gels to change the supramolecular organization. In embodiments, gel modifiers may cause the gel to be stiffer or more relaxed. In embodiments, some gel modifiers may play a role in modulating gel viscosity and/or mechanical strength. In embodiments, gel modifiers alter the nature of the gel structure. Gel modifiers may include crosslinkers, such as metal ions and/or surfactants, water-soluble polymers, secondary polysaccharides, organic acids, organic bases, aldehydes, amines, radical sources, such as methacrylated alginates photopolymerized with photoinitiators, 2-hydroxy-1-[4-(2-hydroxyethoxy) phenyl]-2-methyl-1-propanone (Irgacure 2959) and combinations thereof.

"Sol-gel," as used herein refers to a metal oxide gel network including a polymeric backbone structure including a metal-oxygen-metal [M-O-M] motif. The metal-oxygen-metal motif may include metal bond valencies not engaged in the M-O-M motif, in which case valencies may be occupied by hydroxy groups, alkoxy groups, or both. An exemplary structure is shown as formula L:

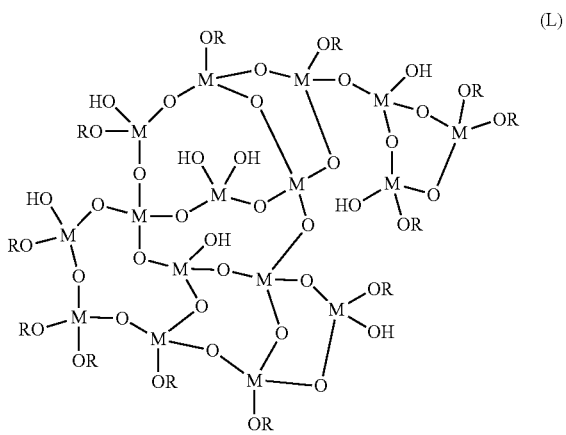

where R is an alkyl group and M is a metal such as silicon, titanium, aluminum, and zirconium, or mixtures of different M throughout the polymer network. As indicated in formula I, a given metal may be fully engaged in the polymer network such that all four valencies on a given M are occupied with an oxygen bonded to a neighboring M. There may be M with metal valencies filled by a single hydroxy, a single alkoxy and the remaining valencies occupied by oxides engaged in the M-O-M matrix. There may also be M with metal valencies filled by two hydroxys, two alkoxys, or one alkoxy and one hydroxy. The network may be characterized by a particular density and or pore size of the gel network, which properties may depend on the metal precursor reagents employed, including the choice of metal itself (or mixture of metals) and any organic alkoxide ligands in the precursor reagent. For example, the longer the carbon chain of an alkoxide ligand on a metal alkoxide precursor, the more porous the gel matrix due to steric hindrance during the polymerization process. Sol-gels can be generated from metal tetraalkoxides, metal tetrahalides and mixed metal alkoxide halides, as well as mixtures of these precursors in a process known as the sol-gel process. The process is typically carried out in water or mixed water organic alcohol systems in the presence of one or more acid or base catalysts.

As used herein, "nicotine" refers to both its free base and salt form. The salt form is typically generated by adding an organic acid to nicotine, although inorganic acids such as hydrochloric acid, hydrobromic acid, sulfuric acid, phosphoric acid, may also be used to form salts. Organic acids include, without limitation, benzoic acid, pyruvic acid, salicylic acid, levulinic acid, malic acid, succinic acid, and citric acid.

The terms "electronic nicotine delivery systems" or "ENDS" or "electronic cigarette" or "e-cigarette" or "low temperature vaporization device" as used herein, refers to an electronic inhaler that vaporizes a portion of the gel compositions disclosed herein into an aerosol mist, simulating the act of tobacco smoking. There are many electronic cigarettes which do not resemble conventional cigarettes at all. The amount of nicotine contained can be chosen by the user via the inhalation. In general, an electronic cigarette contains three components: a plastic cartridge that serves as a mouthpiece and a containing means for the compositions herein, an "atomizer" that vaporizes the compositions, and a battery.

What is claimed is:

1. A cartridge for a vaporizer device, the cartridge comprising:
    a reservoir configured to contain a vaporizable material; and
    an atomizer comprising a heating element and a gel wick, wherein the gel wick is in direct contact with the heating element and wherein the atomizer is configured to heat the vaporizable material to generate a vapor.

2. The cartridge of claim 1, wherein the gel wick comprises a gel wick first end and a gel wick second end, wherein the gel wick first end and the gel wick second end are disposed within the reservoir.

3. The cartridge of claim 1, wherein the gel wick is configured to draw the vaporizable material from the reservoir to the atomizer.

4. The cartridge of claim 1, wherein the gel wick is formed and inserted into the heating element.

5. The cartridge of claim 1, wherein the gel wick is formed around the heating element.

6. The cartridge of claim 1, wherein the heating element is a wire or a mesh.

7. The cartridge of claim 6, wherein the heating element comprises a nickel and chrome alloy.

8. The cartridge of claim 1, wherein the gel wick comprises:
    a superabsorbent polymer.

9. The cartridge of claim 8, wherein the superabsorbent polymer is prepared from monomers selected from the group consisting of an acrylic acid, a salt of the acrylic acid, acrylamide, or combinations thereof.

10. The cartridge of claim 9, wherein the superabsorbent polymer is a polyacrylamide.

11. The cartridge of claim 8, wherein the superabsorbent polymer comprises a chemically-crosslinked polysaccharide or a graft polysaccharide-polyacrylonitrile.

12. The cartridge of claim 8, wherein the superabsorbent polymer is formed in a presence of a crosslinker.

13. The cartridge of claim 1, wherein the gel wick comprises:
    an aqueous polysaccharide-based gellant system comprising:
        a polysaccharide; and
        a gel modifier.

14. The cartridge of claim 1, wherein the gel wick comprises a cellulose matrix and a water-soluble polymer.

15. The cartridge of claim 1, wherein the gel wick comprises an alginate and an alginate crosslinker.

16. A cartridge for a vaporizer device, the cartridge comprising:
    a reservoir configured to contain a vaporizable material;
    a heating element configured to heat the vaporizable material to generate a vapor; and
    a wick consisting of a gel, wherein the wick is configured to transport the vaporizable material from the reservoir to the heating element.

17. The cartridge of claim 16, wherein the gel is formed from a superabsorbent polymer, an aqueous polysaccharide-based gellant system, a cellulose matrix and a water-soluble polymer, or an alginate and an alginate crosslinker.

18. The cartridge of claim 17, wherein the superabsorbent polymer is prepared from monomers selected from the group consisting of an acrylic acid, a salt of the acrylic acid, acrylamide, and combinations thereof.

19. The cartridge of claim 18, wherein the superabsorbent polymer is a polyacrylamide.

* * * * *